United States Patent
Ide

(10) Patent No.: US 11,563,856 B2
(45) Date of Patent: Jan. 24, 2023

(54) VOICE COMMUNICATION TERMINAL, INFORMATION PROCESSING METHOD FOR VOICE COMMUNICATION TERMINAL, DISTRIBUTION SERVER, AND INFORMATION PROCESSING METHOD FOR DISTRIBUTION SERVER

(71) Applicant: SONY CORPORATION, Tokyo (JP)

(72) Inventor: Yuji Ide, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,404

(22) PCT Filed: Jul. 17, 2019

(86) PCT No.: PCT/JP2019/028176
§ 371 (c)(1),
(2) Date: Jan. 18, 2021

(87) PCT Pub. No.: WO2020/022167
PCT Pub. Date: Jan. 30, 2020

(65) Prior Publication Data
US 2021/0274047 A1    Sep. 2, 2021

(30) Foreign Application Priority Data
Jul. 27, 2018 (JP) .............................. JP2018-140913

(51) Int. Cl.
*H04M 7/00* (2006.01)
*H04L 12/26* (2006.01)
*H04L 43/0852* (2022.01)

(52) U.S. Cl.
CPC ...... *H04M 7/0084* (2013.01); *H04L 43/0852* (2013.01)

(58) Field of Classification Search
CPC .......................... H04L 43/0852; H04M 7/0084
See application file for complete search history.

(56) References Cited

U.S. PATENT DOCUMENTS 5,930,752 A     7/1999  Kawaguchi et al.
9,814,080 B2 *  11/2017 Sakazume ............... H04W 4/10
(Continued)

FOREIGN PATENT DOCUMENTS

JP     09-083655 A    3/1997
JP     2002-232576 A  8/2002
(Continued)

OTHER PUBLICATIONS

International Search Report and Written Opinion of PCT Application No. PCT/JP2019/028176, dated Sep. 17, 2019, 10 pages of ISRWO.

*Primary Examiner* — Rasheed Gidado
(74) *Attorney, Agent, or Firm* — Chip Law Group

(57) ABSTRACT

An impact of a delay time on a conversation is reduced. A voice packet is transmitted to a distribution server. A user is notified of being in a wait time from when transmission of the voice packet stops until when voice packet transmission becomes available next. The wait time is calculated on the basis of a first delay time that is a delay time between a local terminal and the distribution server and a second delay time that is the maximum delay time among delay times between a plurality of terminals including the local terminal and the distribution server. The user can easily know the speaking timing from the local terminal, and speech from the local terminal and speech from another terminal can be made not to mix.

18 Claims, 16 Drawing Sheets

(56) References Cited

U.S. PATENT DOCUMENTS

| | | | |
|---|---|---|---|
| 2006/0093330 A1* | 5/2006 | Shimozawa | G11B 27/105 |
| 2008/0117834 A1* | 5/2008 | Ohno | H04W 4/10 |
| | | | 370/252 |
| 2008/0131076 A1* | 6/2008 | Hashimoto | H04N 5/76 |
| | | | 386/203 |
| 2008/0160980 A1* | 7/2008 | Harris | H04M 3/56 |
| | | | 455/418 |
| 2015/0256988 A1* | 9/2015 | Wen | H04W 4/16 |
| | | | 370/329 |
| 2016/0048430 A1* | 2/2016 | Bolik | G06F 11/1448 |
| | | | 711/162 |
| 2018/0176987 A1* | 6/2018 | Oda | H04L 65/103 |
| 2018/0227333 A1* | 8/2018 | Stone | H04L 65/1066 |
| 2018/0234815 A1* | 8/2018 | Tanaka | H04B 7/2678 |

FOREIGN PATENT DOCUMENTS

| | | |
|---|---|---|
| JP | 2004-040200 A | 2/2004 |
| JP | 2010-093479 A | 4/2010 |
| JP | 2017-041696 A | 2/2017 |

* cited by examiner

FIG. 3A

VOICE PACKET

| AUDIO DATA | MAXIMUM DELAY TIME INFORMATION |
|---|---|

FIG. 3B

SYNCHRONOUS PACKET

| TIME DATA | MAXIMUM DELAY TIME INFORMATION |
|---|---|

METHOD 2: PRIORITIZE VOICE WITH LARGER DELAY

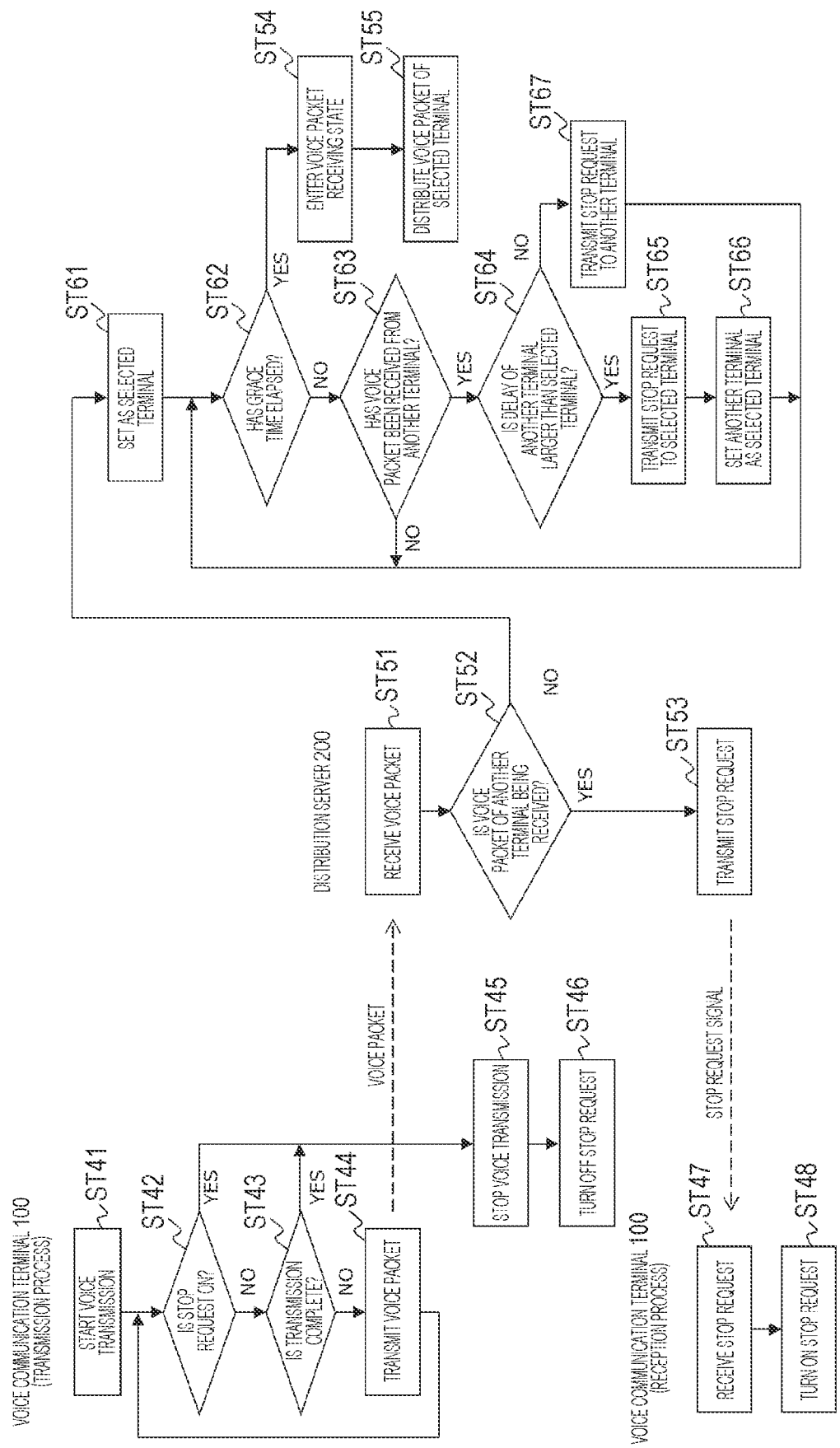

VOICE COMMUNICATION TERMINAL, INFORMATION PROCESSING METHOD FOR VOICE COMMUNICATION TERMINAL, DISTRIBUTION SERVER, AND INFORMATION PROCESSING METHOD FOR DISTRIBUTION SERVER

CROSS REFERENCE TO RELATED APPLICATIONS

This application is a U.S. National Phase of International Patent Application No. PCT/JP2019/028176 filed on Jul. 17, 2019, which claims priority benefit of Japanese Patent Application No. JP 2018-140913 filed in the Japan Patent Office on Jul. 27, 2018. Each of the above-referenced applications is hereby incorporated herein by reference in its entirety.

TECHNICAL FIELD

The present technology relates to a voice communication terminal, an information processing method for a voice communication terminal, a program, a distribution server, and an information processing method for a distribution server, and more particularly to a voice communication terminal and the like capable of reducing an impact of a delay time on a conversation.

BACKGROUND ART

For example, Patent Document 1 discloses a technique for performing real-time voice communication among a plurality of terminals using a distribution server and the Internet. The real-time voice communication using the Internet has an indefinite delay time, and due to the nature of the network that a delay time changes depending on a distance while it can be used from anywhere in the world, a delay time for each terminal is indefinite and a variation range thereof is significantly large in the voice communication.

CITATION LIST

Patent Document

Patent Document 1: Japanese Patent Application Laid-Open No. 2010-093479

SUMMARY OF THE INVENTION

Problems to be Solved by the Invention

An object of the present technology is to reduce the impact of the delay time on a conversation.

Solutions to Problems

A concept of the present technology is directed to:
a voice communication terminal including:
a voice packet transmission unit that transmits a voice packet to a distribution server; and
a notification control unit that notifies a user of being in a wait time from when transmission of the voice packet stops until when voice packet transmission becomes available next, in which
the wait time is calculated on the basis of delay time information between the distribution server and a plurality of voice communication terminals.

In the present technology, the voice packet transmission unit transmits a voice packet to the distribution server. Then, the notification control unit notifies the user of being in the wait time. Here, the wait time is calculated on the basis of the delay time information between the distribution server and the plurality of voice communication terminals. For example, the wait time is calculated on the basis of a first delay time that is a delay time between a local terminal and the distribution server and a second delay time that is the maximum delay time among delay times between the plurality of terminals including the local terminal and the distribution server.

For example, a wait time calculation unit that calculates a wait time on the basis of the first delay time and the second delay time may be further provided. With this arrangement, the distribution server is not required to calculate a wait time of each terminal, whereby the load on the distribution server can be reduced. In this case, for example, the wait time calculation unit may include, in the wait time, at least a time twice as long as the first delay time and a time twice as long as the second delay time. With this arrangement, it becomes possible to sufficiently suppress mixture of speech caused by speech from another terminal that has responded to the speech from the local terminal.

For example, the notification control unit may make notification of being in the wait time in a visual, auditory, or tactile output mode. Conceivable examples of the notification in the visual output mode include displaying characters or marks on a display and causing an issuance element such as a light-emitting diode (LED) to emit light or to blink. Furthermore, conceivable examples of the notification in the auditory output mode include audio output (voice, noise sound) using a headset or a speaker. Furthermore, conceivable examples of the notification in the tactile output mode include vibrating the terminal. With this arrangement, the user is enabled to be notified under various conditions.

As described above, according to the present technology, the user is notified of being in the wait time from when transmission of the voice packet stops until when voice packet transmission becomes available next. Therefore, the user can easily know the speaking timing from the local terminal, and speech from the local terminal and speech from another terminal can be made not to mix.

Although the delay time may be about 300 to 500 milliseconds in a close range, the delay time may reach several seconds in the case of long-distance communication with overseas. If the user speaks without understanding such a long delay time, the speech from each other is mixed, whereby a conversation cannot be carried out smoothly. According to the present technology, as described above, speech from the local terminal and speech from another terminal can be made not to mix, whereby a smooth conversation can be achieved.

Note that, in the present technology, a delay time update unit that periodically updates the first delay time and the second delay time may be further provided, for example. In this case, for example, the delay time update unit may periodically update the first delay time and the second delay time on the basis of time information from the distribution server. With the delay time periodically updated in this manner, it becomes possible to constantly obtain an appropriate value for the wait time even when the delay time fluctuates.

Furthermore, in the present technology, it may be further provided with a packet reception unit that receives a voice packet from the distribution server, and a reproduction control unit that delays reproduction of audio data included in the received voice packet by a reproduction delay time obtained on the basis of the first delay time and the second delay time, for example. With this arrangement, it becomes possible to synchronize reproduction timing of all the terminals to which a voice packet is distributed from the distribution server. In this case, for example, a reproduction delay time calculation unit that calculates a reproduction delay time on the basis of the first delay time and the second delay time may be further provided. With this arrangement, the distribution server is not required to calculate a reproduction delay time of each terminal, whereby the load on the distribution server can be reduced.

In the case of transmitting voice to a plurality of terminals, the delay time required to receive the voice differs depending on the terminal, whereby the reproduction time of each terminal differs if reproduction is carried out immediately after reception. According to the present technology, as described above, it becomes possible to synchronize reproduction timing of all the terminals to which a voice packet is distributed from the distribution server, whereby a smooth conversation can be achieved.

Furthermore, another concept of the present technology is directed to:

a distribution server including:

a voice packet processing unit that receives a voice packet from a voice communication terminal among a plurality of voice communication terminals and distributes the voice packet to the other voice communication terminals among the plurality of voice communication terminals; and a delay information processing unit that receives delay time information between the plurality of voice communication terminals and the distribution server and transmits maximum delay time information to the plurality of voice communication terminals.

In the present technology, the voice packet processing unit receives a voice packet from a voice communication terminal among a plurality of voice communication terminals, and distributes the voice packet to the other voice communication terminals among the plurality of voice communication terminals. Furthermore, the delay information processing unit receives the delay time information between the plurality of voice communication terminals and the distribution server, and transmits the maximum delay time information to the plurality of voice communication terminals. For example, the delay information processing unit may transmit the maximum delay time information to the plurality of voice communication terminals using a synchronous packet or a voice packet.

As described above, in the present technology, the delay time information between the plurality of voice communication terminals and the distribution server is received, and the maximum delay time information is transmitted to the plurality of voice communication terminals. Therefore, as described above, each of the plurality of voice communication terminals is enabled to satisfactorily calculate the wait time from when the voice packet transmission stops until when the voice packet transmission becomes available next, the reproduction delay time for delaying reproduction of the audio data included in the received voice packet, and the like on the basis of the maximum delay time information, for example.

Furthermore, another concept of the present technology is directed to:

an information processing method for a voice communication terminal including:

receiving a voice packet from a distribution server; and delaying reproduction of audio data included in the received voice packet by a reproduction delay time calculated on the basis of a first delay time that is a delay time between the voice communication terminal and the distribution server and a second delay time that is the maximum delay time among delay times between a plurality of terminals including the voice communication terminal and the distribution server.

In the present technology, a voice packet is received from the distribution server. Then, reproduction of the audio data included in the received voice packet is delayed by the reproduction delay time calculated on the basis of the first delay time that is a delay time between the local terminal and the distribution server and the second delay time that is the maximum delay time among the delay times between the plurality of terminals including the local terminal and the distribution server.

For example, a procedure of calculating a reproduction delay time on the basis of the first delay time and the second delay time may be further included. In this case, for example, the reproduction delay time may be calculated by subtracting the first delay time from the second delay time. With this arrangement, the distribution server is not required to calculate a wait time of each terminal, whereby the load on the distribution server can be reduced.

As described above, in the present technology, a reproduction delay time is calculated on the basis of the first delay time (delay time of the local terminal) and the second delay time (maximum delay time among delay times of a plurality of terminals including the local terminal), and reproduction of the audio data included in the received voice packet is delayed by the reproduction delay time. Therefore, it becomes possible to synchronize reproduction timing of all the terminals to which a voice packet is distributed from the distribution server.

Note that, in the present technology, a procedure of periodically updating the first delay time and the second delay time may be further included, for example. In this case, for example, the first delay time and the second delay time may be periodically updated on the basis of time information from the distribution server. With the delay time periodically updated in this manner, it becomes possible to constantly obtain an appropriate value for the reproduction delay time even when the delay time fluctuates.

Furthermore, another concept of the present technology is directed to:

an information processing method for a distribution server including:

receiving a voice packet from a voice communication terminal and transmitting the voice packet to another voice communication packet; and in a state of receiving voice packets from a plurality of voice communication terminals in a temporally overlapped manner, performing control to select a voice packet from one voice communication terminal and distributing the voice packet to another voice communication terminal.

In the present technology, a voice packet is received from the voice communication terminal, and the voice packet is transmitted to another voice communication packet. In a state where voice packets from a plurality of voice communication terminals are received in a temporally overlapped manner, a voice packet from one voice communication terminal is selected and distributed to another voice communication terminal.

For example, at the time of selecting a voice packet from one voice communication terminal, a voice packet from the voice communication terminal whose voice packet has been received at the earliest among the plurality of voice communication terminals may be selected. Furthermore, for example, at the time of selecting a voice packet from one voice communication terminal, a voice packet from the voice communication terminal having the maximum delay time with its own server among the plurality of voice communication terminals may be selected.

As described above, in the present technology, in the state where voice packets from a plurality of voice communication terminals are received in a temporally overlapped manner, a voice packet from one voice communication terminal is selected and distributed to another voice communication terminal. therefore, it becomes possible to suppress collision of speech from the plurality of voice communication terminals.

Effects of the Invention

According to the present technology, it becomes possible to reduce an impact of a delay time on a conversation, whereby a smooth conversation can be achieved. Note that the effects described herein are not necessarily limited, and may be any of the effects described in the present disclosure.

BRIEF DESCRIPTION OF DRAWINGS

FIGS. 3A and 3B are diagrams illustrating exemplary configurations of a voice packet and a synchronous packet.

FIG. 18 is a flowchart schematically illustrating an exemplary transmission process of the voice communication terminal and an exemplary distribution process of the distribution server in a case where the method 2 is adopted.

MODE FOR CARRYING OUT THE INVENTION

Hereinafter, a mode for carrying out the invention (hereinafter referred to as an "embodiment") will be described. Note that descriptions will be given in the following order.
1. Embodiment
2. Variations 1. Embodiment

[Voice Communication System]

Figure 1:
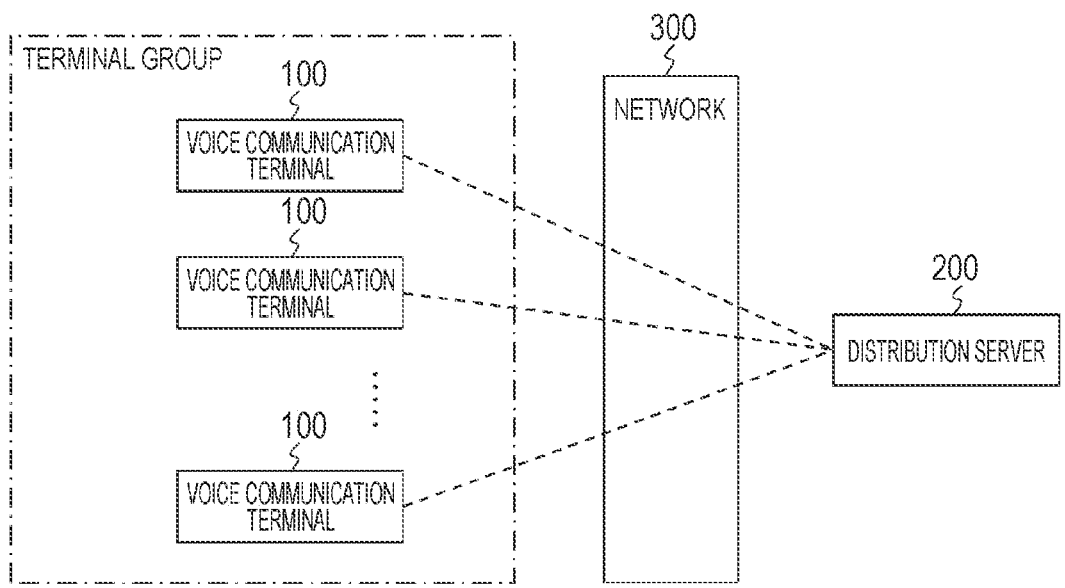
FIG. 1 is a block diagram illustrating an exemplary configuration of a voice communication system as an embodiment.

FIG. 1 illustrates an exemplary configuration of a voice communication system 10 as an embodiment. The voice communication system 10 includes a plurality of voice communication terminals 100 constituting a terminal group, and a distribution server 200. The plurality of voice communication terminals 100 is connected to the distribution server 200 via a network 300 such as the Internet. Here, the plurality of voice communication terminals 100 is connected to the distribution server 200 by IP packet/IP communication.

A time synchronization process using a network time protocol (NTP), for example, is periodically performed between each of the voice communication terminals 100 and the distribution server 200. Each of the voice communication terminals 100 calculates, at the time of performing the time synchronization process, a delay time between the local terminal and the distribution server 200, and transmits information associated with the delay time to the distribution server 200. The distribution server 200 receives the information associated with the delay time from each of the voice communication terminals 100, obtains a maximum delay time, and transmits information associated with the maximum delay time to each of the voice communication terminals 100.

The voice communication terminals 100 transmit voice packets, which are IP packets in IP communication, to the distribution server 200. The distribution server 200 distributes a voice packet received from a certain voice communication terminal 100 to the remaining voice communication terminals 100. Each of the voice communication terminals 100 calculates a reproduction delay time on the basis of a delay time (first delay time) of its own terminal and a maximum delay time (second delay time). The first delay time and the second delay time are periodically updated as they change depending on a network connection state (network traffic state). Note that a traffic capacity, a traffic speed, the number of packets, a top talker (communication target), a band usage rate, a usage time zone, a busy time zone, and the like, which are to be indicators for network traffic, can be monitored on the basis of traffic monitoring.

Here, with a delay time of a local terminal assumed to be Tsd and a maximum delay time assumed to be Tmd, a reproduction delay time Tpd can be calculated by subtracting the delay time Tsd of the local terminal from the maximum delay time Tmd, as expressed by the following formula (1).

$$Tpd=Tmd-Tsd \qquad (1)$$

Note that it is also conceivable that the distribution server 200 calculates a reproduction delay time of each of the voice communication terminals 100 to supply it to the respective voice communication terminals 100. The load on the distribution server 200 can be reduced by each of the voice communication terminals 100 calculating a reproduction delay time while the load on the respective voice communication terminals 100 can be reduced by the distribution server 200 calculating a reproduction delay time of each of the voice communication terminals 100. Hereinafter, descriptions will be given on the assumption that each of the voice communication terminals 100 calculates a reproduction delay time of its own terminal.

Each of the voice communication terminals 100 delays the reproduction of audio data included in the received voice packet by the reproduction delay time obtained as described above. With the reproduction of the audio data delayed by the reproduction delay time in this manner, it becomes possible to synchronize reproduction timing of all the voice communication terminals 100 to which voice packets are distributed from the distribution server 200, whereby a smooth conversation can be achieved.

Furthermore, each of the voice communication terminals 100 calculates a wait time from when voice packet transmission stops until when voice packet transmission becomes available next on the basis of the delay time of the local terminal (first delay time) and the maximum delay time (second delay time).

Here, in a case where the delay time of the local terminal and the maximum delay time are assumed to be Tsd and Tmd, respectively, a wait time Twt includes at least a time twice as long as the delay time Tsd of the local terminal and a time twice as long as the maximum delay time Tmd, as expressed by the following formula (2). Note that, although α indicates a thinking time required for a counterpart to respond in the formula (2), it is conceivable not to provide this α.

$$Twt=2*Tsd+2*Tmd+\alpha \qquad (2)$$

Note that it is also conceivable that the distribution server 200 calculates a wait time of each of the voice communication terminals 100 to supply it to the respective voice communication terminals 100. The load on the distribution server 200 can be reduced by each of the voice communication terminals 100 calculating a wait time while the load on the respective voice communication terminals 100 can be reduced by the distribution server 200 calculating a wait time of each of the voice communication terminals 100. Hereinafter, descriptions will be given on the assumption that each of the voice communication terminals 100 calculates a wait time.

Each of the voice communication terminals 100 notifies a user of being in the wait time during the period from when the transmission of the voice packet stops until when the wait time elapses. In this case, a visual, auditory, or tactile output mode is used for the notification. Conceivable examples of the notification in the visual output mode include displaying characters or marks on a display of a terminal and causing an issuance element such as an LED attached to the terminal to emit light or to blink. Furthermore, conceivable examples of the notification in the auditory output mode include audio output (voice, noise sound) using a headset or a speaker of the terminal. Furthermore, conceivable examples of the notification in the tactile output mode include vibrating the terminal.

By notifying the user of being in the wait time in this manner, the user is enabled to easily know the speaking timing from the local terminal, and speech from the local terminal and speech from another terminal can be made not to mix, whereby a smooth conversation can be achieved.

In a state where voice packets from a plurality of voice communication terminals 100 are received in a temporally overlapped manner, the distribution server 200 selects a voice packet from one voice communication terminal 100 and transmits it to other voice communication terminals 100. With this arrangement, it becomes possible to suppress collision of speech from the plurality of voice communication terminals 100, whereby a smooth conversation can be achieved. In this case, the distribution server 200 transmits stop request signals to each of the voice communication terminals 100 not having been selected, and each of the voice communication terminals 100 stops the voice packet transmission.

"Voice Communication Terminal"

Figure 2:
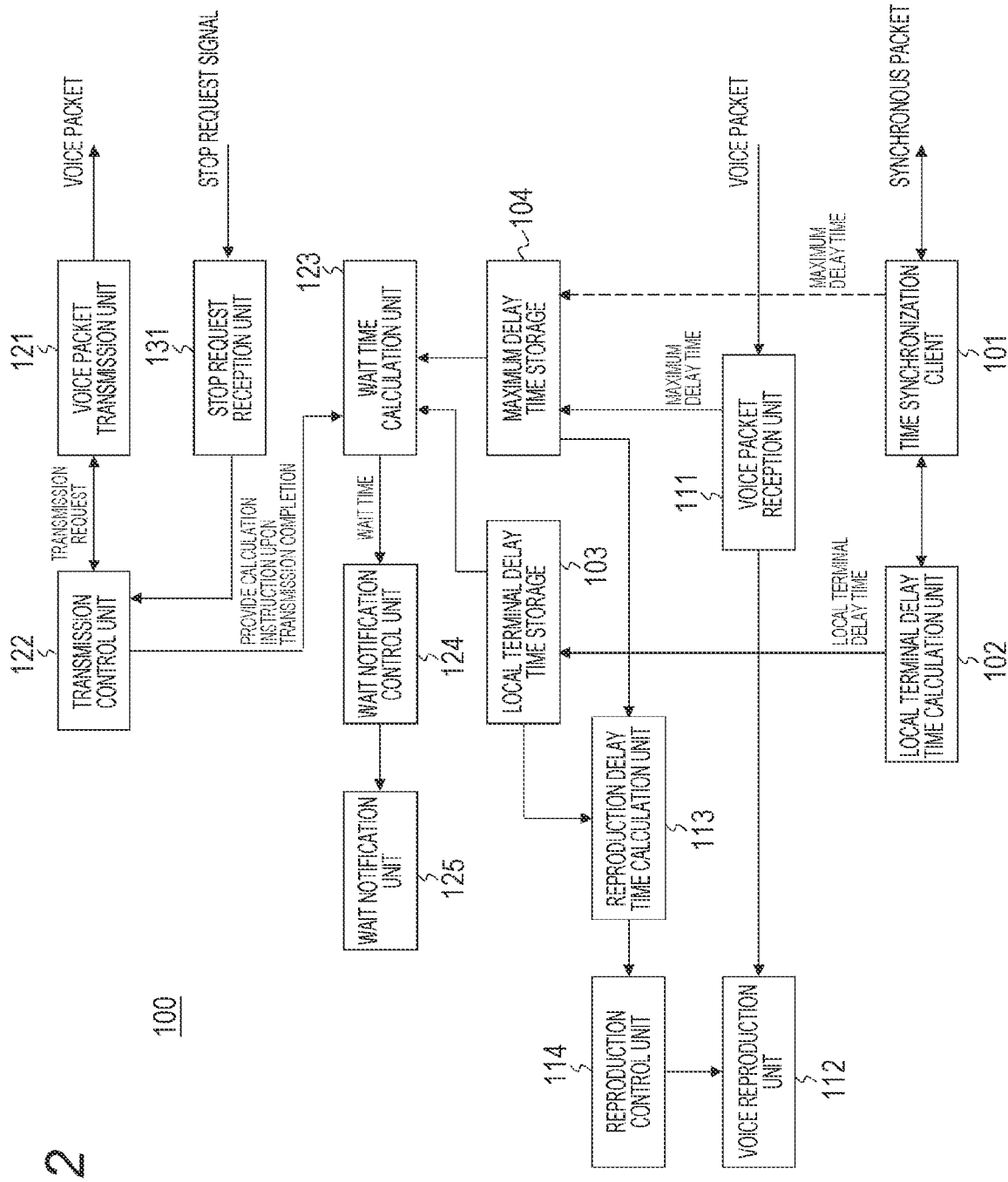
FIG. 2 is a block diagram illustrating an exemplary configuration of a voice communication terminal.

FIG. 2 illustrates an exemplary configuration of the voice communication terminal 100. The voice communication terminal 100 includes a synchronization client 101, a local terminal delay time calculation unit 102, a local terminal delay time storage 103, a maximum delay time storage 104, a voice packet reception unit 111, a voice reproduction unit 112, a reproduction delay time calculation unit 113, a reproduction control unit 114, a voice packet transmission unit 121, a transmission control unit 122, a wait time calculation unit 123, a wait notification control unit 124, a wait notification unit 125, and a stop request reception unit 131.

The time synchronization client 101 periodically exchanges synchronous packets with a time synchronization server of the distribution server 200 to carry out a time synchronization process. In a case where the synchronous packet transmitted from the distribution server 200 includes information associated with the maximum delay time (second delay time), the time synchronization client 101 extracts the information, transmits it to the maximum delay time storage 104, and saves it by overwriting.

The local terminal delay time calculation unit 102 calculates, as described above, a delay time (first delay time) of the local terminal on the basis of the time information at the time when the time synchronization client 101 carries out the time synchronization process, transmits the delay time to the local terminal delay time storage 103, and saves it by overwriting. Furthermore, the local terminal delay time calculation unit 102 supplies the calculated delay time of the local terminal to the time synchronization client 101, and the time synchronization client 101 transmits the delay time to the distribution server 200.

The voice packet reception unit 111 receives the voice packet transmitted from the distribution server 200, and supplies the audio data included therein to the voice reproduction unit 112. Furthermore, in a case where the voice packet includes information associated with the maximum delay time (second delay time), the voice packet reception unit 111 extracts the information, transmits it to the maximum delay time storage 104, and saves it by overwriting.

For example, FIG. 3A illustrates an exemplary case where the voice packet includes information associated with the maximum delay time (second delay time), and the voice packet includes maximum delay time information in addition to audio data. FIG. 3B illustrates an exemplary case where the synchronous packet includes information associated with the maximum delay time (second delay time), and the synchronous packet includes maximum delay time information in addition to time data.

The voice reproduction unit 112 reproduces the audio data supplied from the voice packet reception unit 111. Specifically, the audio data is subject to decoding processing, noise removal processing, D/A conversion processing, and the like to obtain output audio signals. The output audio signals are transmitted to a speaker or a headset (not illustrated).

The reproduction delay time calculation unit 113 obtains the information associated with the delay time of the local terminal (first delay time) from the local terminal delay time storage 103, obtains the information associated with the maximum delay time (second delay time) from the maximum delay time storage 104, calculates a reproduction delay time on the basis of the formula (1) mentioned above, and supplies the time information to the reproduction control unit 114. The reproduction control unit 114 delays, on the basis of the reproduction delay time supplied from the reproduction delay time calculation unit 113, the reproduction of the audio data in the voice reproduction unit 112 by the reproduction delay time.

The voice packet transmission unit 121 transmits the voice packet including the audio data to the distribution server 200. The transmission control unit 122 issues a transmission request to the voice packet transmission unit 121 and performs control. Furthermore, the transmission control unit 122 instructs the wait time calculation unit 123 to calculate a wait time at the timing of the transmission completion.

The wait time calculation unit 123 calculates, using the formula (2) mentioned above, a wait time on the basis of the calculation instruction from the transmission control unit 122, and supplies the time information to the wait notification control unit 124. The wait notification control unit 124 controls the notification operation of the wait notification unit 125 to notify the user of being in the wait time during the period from when the transmission is complete until when the wait time elapses. The wait notification unit 125 makes notification of being in the wait time in at least a visual, auditory, or tactile output mode.

The stop request reception unit 131 receives the stop request signals transmitted from the distribution server 200, and supplies them to the transmission control unit 122. When the stop request reception unit 131 receives a stop request, the transmission control unit 122 stops the supply of the transmission request to the voice packet transmission unit 121, and stops the transmission of the voice packet from the voice packet transmission unit 121.

"Distribution Server"

Figure 4:
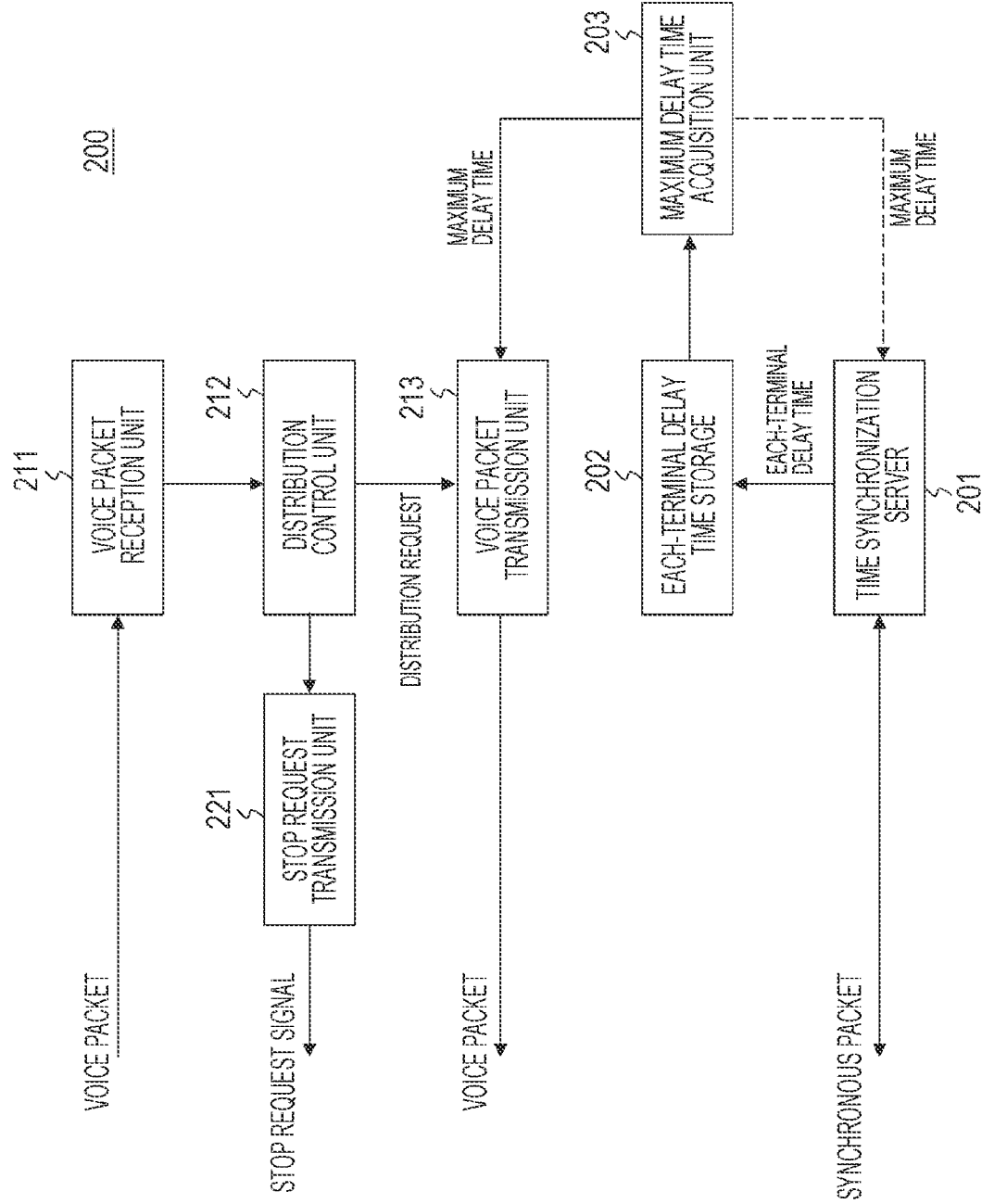
FIG. 4 is a block diagram illustrating an exemplary configuration of a distribution server.

FIG. 4 illustrates an exemplary configuration of the distribution server 200. The distribution server 200 includes a time synchronization server 201, an each-terminal delay time storage 202, a maximum delay time acquisition unit 203, a voice packet reception unit 211, a distribution control unit 212, a voice packet transmission unit 213, and a stop request transmission unit 221.

The time synchronization server 201 periodically exchanges synchronous packets with the time synchronization client of each of the voice communication terminals 100 to carry out the time synchronization process. Furthermore, the time synchronization server 201 receives the delay time information of each terminal transmitted from each of the voice communication terminals 100, transmits the information to each-terminal delay time storage 202, and saves it by overwriting.

The maximum delay time acquisition unit 203 periodically obtains the maximum delay time from the delay time information of each of the voice communication terminals 100 stored in the each-terminal delay time storage 202, and supplies the maximum delay time information to the time synchronization server 201 and the voice packet transmission unit 213. The time synchronization server 201 includes the maximum delay time information in the synchronous packet, and transmits it to each of the voice communication terminals 100. Furthermore, the voice packet transmission unit 213 includes the maximum delay time information in the voice packet at the time of transmitting the voice packet to the voice communication terminal 100.

The voice packet reception unit 211 receives the voice packet transmitted from the voice transmission terminal 100, and supplies it to the distribution control unit 212. The distribution control unit 212 supplies the voice packet received by the voice packet reception unit 211 to the voice packet transmission unit 213 together with a distribution request, and controls the transmission operation of the voice packet performed in the voice packet transmission unit 213.

Under the control of the distribution control unit 212, the voice packet transmission unit 213 simultaneously transmits the voice packet received by the voice packet reception unit 211 to the voice communication terminals 100 excluding the voice communication terminal 100 that is the transmission source of the voice packet.

Note that, when the voice packet reception unit 211 receives voice packets from a plurality of voice communication terminals 100 in a temporally overlapped manner, the distribution control unit 212 selects a voice packet from one voice communication terminal and supplies it to the voice packet transmission unit 213. In this case, the distribution control unit 212 controls the stop request transmission unit 221 to cause it to transmit stop request signals to each of the voice communication terminals 100 that has not been selected.

"Time Synchronization Process and Delay Time Process"

Figure 5:
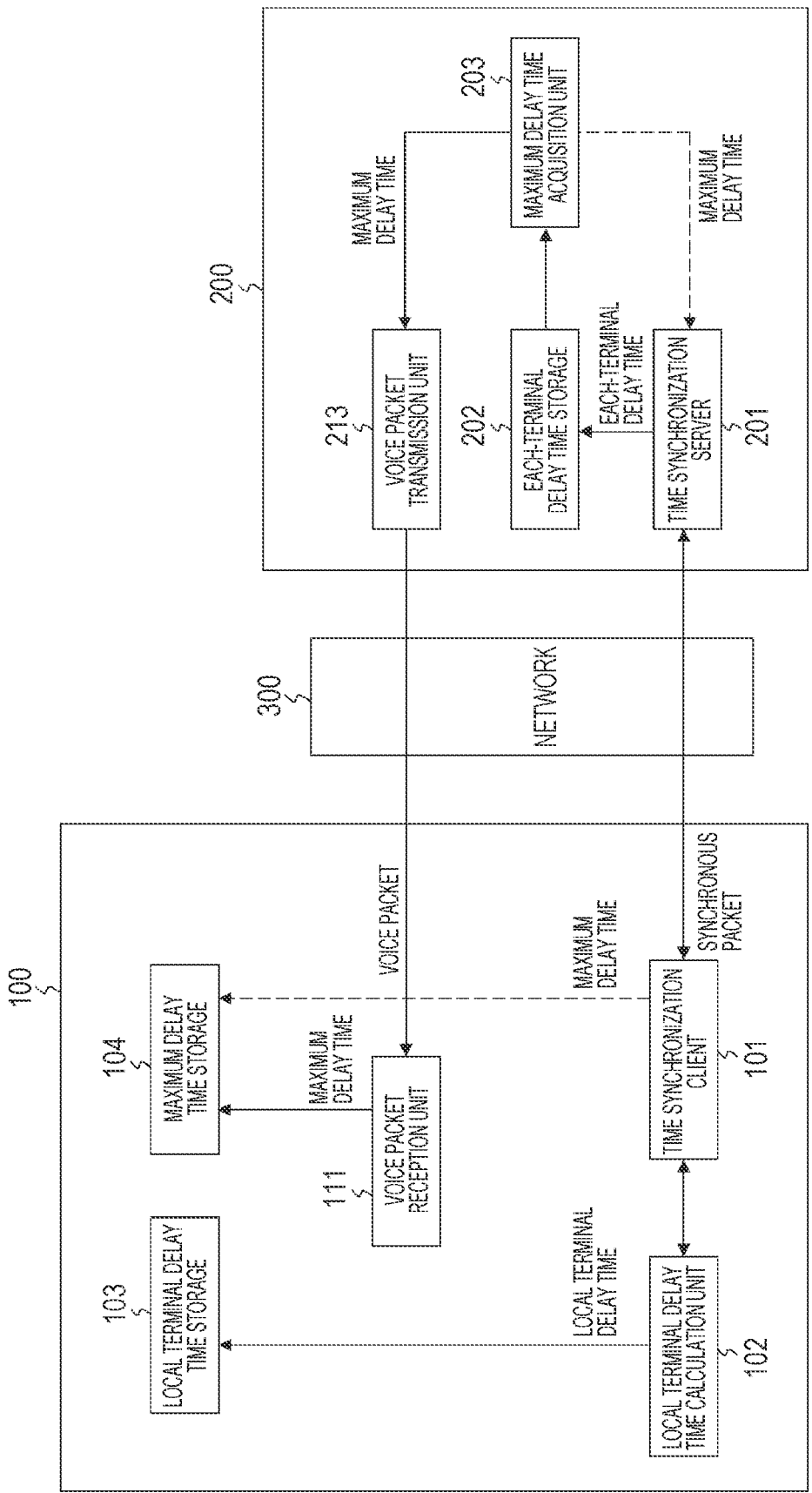
FIG. 5 is a diagram illustrating only a part related to processes of time synchronization and delay time in the voice communication terminal and the distribution server.

Details of the processes of the time synchronization and the delay time performed by the voice communication terminal 100 and the distribution server 200 will be described. FIG. 5 illustrates only a part related to the processes of the time synchronization and the delay time in the voice communication terminal 100 and the distribution server 200.

Figure 6:
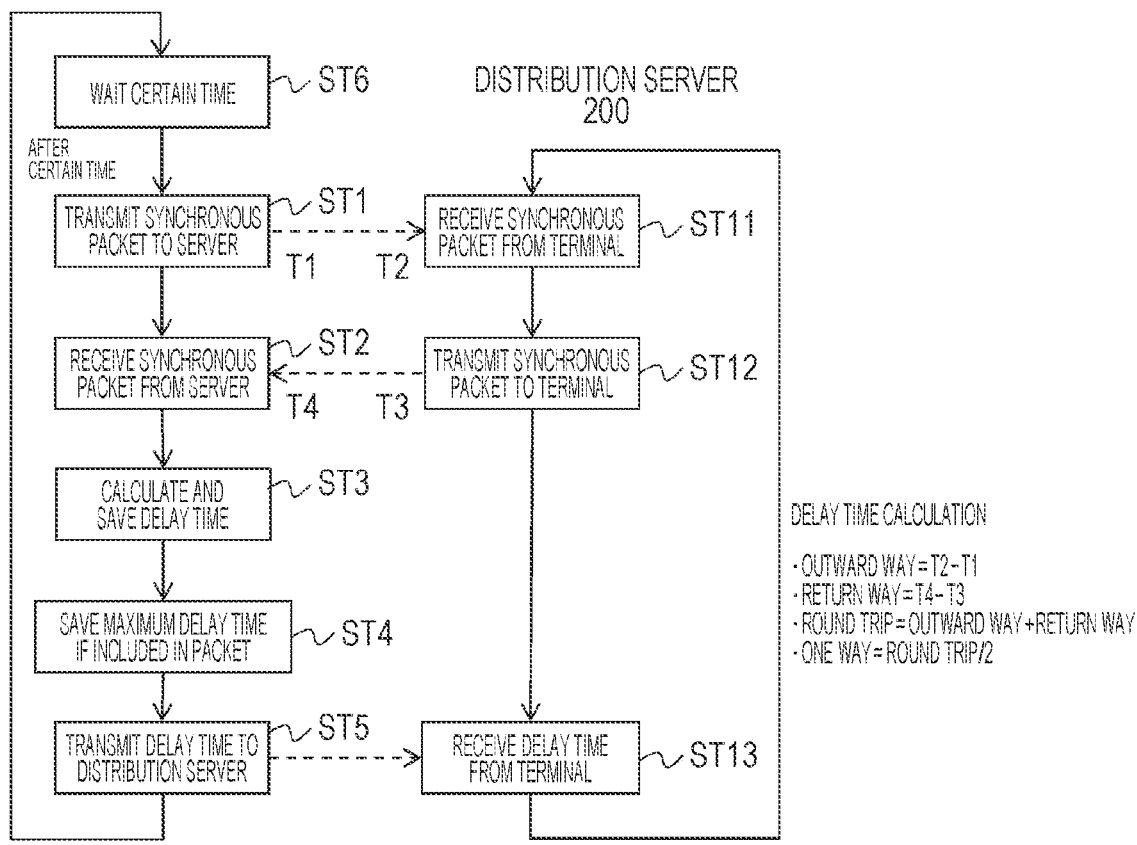
FIG. 6 is a flowchart schematically illustrating an exemplary process of the time synchronization and delay time periodically performed between the voice communication terminal and the distribution server.

The flowchart of FIG. 6 schematically illustrates an exemplary process of the time synchronization and delay time periodically performed between the voice communication terminal 100 and the distribution server 200. At time T1, the voice communication terminal 100 transmits, using the time synchronization client 101, a synchronous packet including time information of the time T1 to the distribution server 200 (step ST1). At time T2, the distribution server 200 receives, using the time synchronization server 201, the synchronous packet from the voice communication terminal 100 (step ST11).

At time T3, the distribution server 200 transmits, using the time synchronization server 201, a synchronous packet having time information of the times T1, T2, and T3 to the voice communication terminal 100 (step ST12). At time T4, the voice communication terminal 100 receives, using the time synchronization client 101, the synchronous packet from the distribution server 200 (step ST2).

After receiving the synchronous packet from the distribution server 200, the voice communication terminal 100 calculates, with the local terminal delay time calculation unit 102, a delay time of its own terminal using the time information included in the synchronous packet and the like, and saves the delay time in the local terminal delay time storage 103 (step ST3). Here, the delay time Tsd of its own terminal is calculated on the basis of the following formula (3), for example.

$$Tsd=\{|T2-T1|)+(|T4-T3|\}/2 \qquad (3)$$

Furthermore, in a case where the synchronous packet transmitted from the distribution server 200 includes information associated with the maximum delay time, the voice communication terminal 100 extracts, using the time synchronization client 101, the information and saves it in the maximum delay time storage 104 by overwriting (step ST4). Note that, in a case where the voice packet transmitted from the distribution server 200 includes the information associated with the maximum delay time, the voice packet reception unit 111 extracts the information, and saves it in the maximum delay time storage 104 by overwriting.

Furthermore, after calculating the delay time of its own terminal, the voice communication terminal 100 transmits, using the time synchronization client 101, information associated with the calculated delay time of its own terminal to the distribution server 200 (step ST5). Thereafter, the voice communication terminal 100 waits for a certain time (step ST6), and then returns to the processing of step ST1 to repeat the process similar to that as described above.

Furthermore, after transmitting the synchronous packet to the voice communication terminal 100, the distribution server 200 receives, using the time synchronization server 201, information associated with the delay time of the voice communication terminal 100 transmitted from the terminal itself, and saves it in the each-terminal delay time storage 202 by overwriting (step ST13). Note that the distribution server 200 obtains the maximum delay time using the maximum delay time acquisition unit 203 on the basis of the delay time information of each of the voice communication terminals 100 stored in the each-terminal delay time storage 202, and supplies the information to the time synchronization server 201 and the voice packet transmission unit 213.

Therefore, when transmitting a synchronous packet to the voice communication terminal 100 at time T3, the distribution server 200 can include the maximum delay time information in the synchronous packet. Furthermore, when transmitting a voice packet from the voice packet transmission unit 213 to the voice communication terminal 100, the distribution server 200 can include the maximum delay time information in the voice packet.

Figure 7:
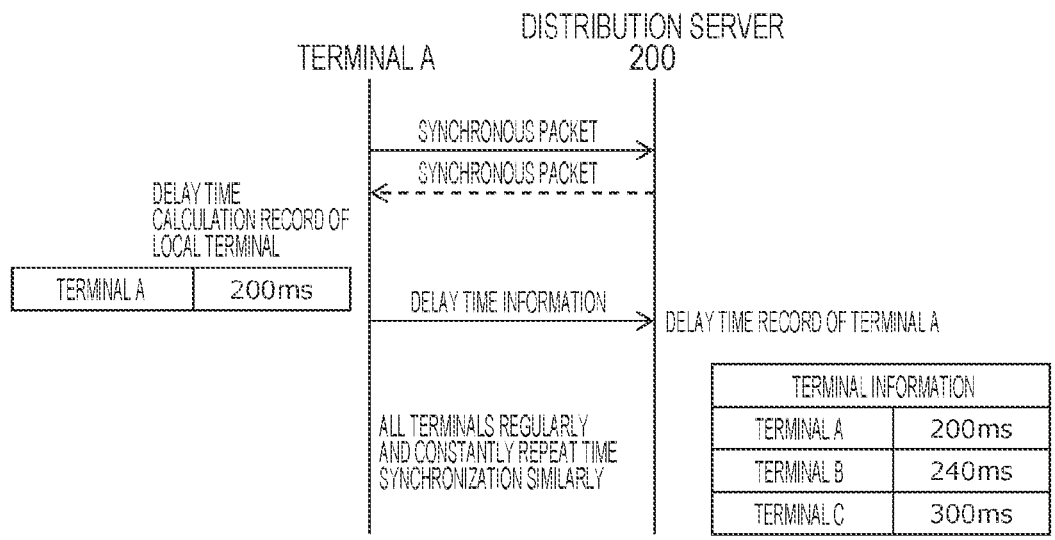
FIG. 7 is a diagram illustrating an exemplary sequence of exchanging a synchronous packet between a terminal A and the distribution server and transmitting, from the terminal A to the distribution server, delay time information of its own terminal.

FIG. 7 illustrates an exemplary sequence of exchanging a synchronous packet between the terminal A and the distribution server 200 and transmitting, from the terminal A to the distribution server 200, delay time information of its own terminal. All terminals in the terminal group are to repeat such an operation. In the illustrated example, the delay time of the terminal A is 200 ms, and the delay times of other terminals B and C are 240 ms and 300 ms, respectively, and a state in which the distribution server 200 retains the delay time information of the terminals A, B, and C is illustrated. In this state, 300 ms is to be obtained as a maximum delay time.

"Reproduction Process of Reception Terminal"

Figure 8:
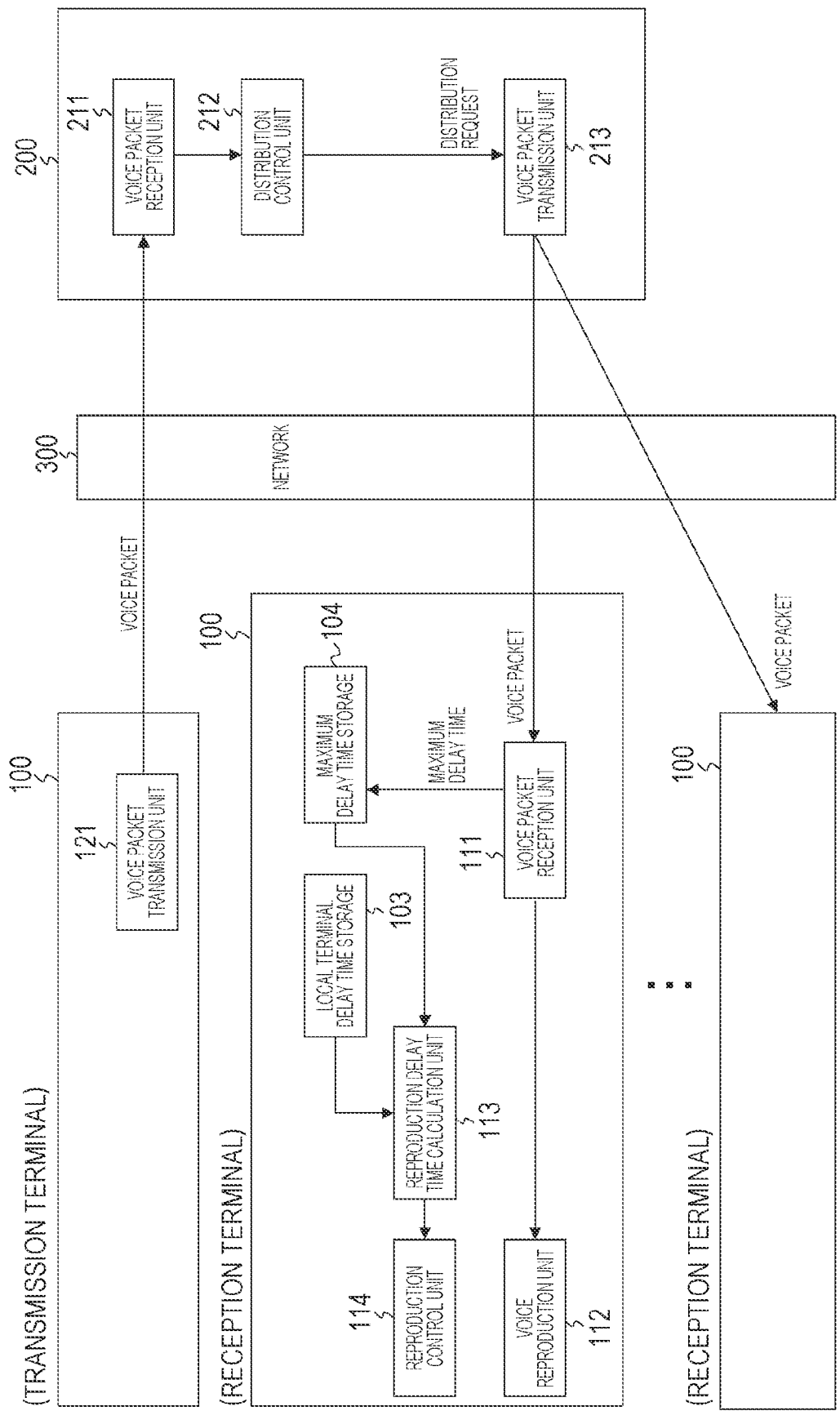
FIG. 8 is a diagram illustrating a state in which a voice packet from a certain voice communication terminal is transmitted to a plurality of voice communication terminals via the distribution server.

Details of an audio data reproduction process performed in each of the voice communication terminals 100 that has received a voice packet from a certain voice communication terminal 100 via the distribution server 200 will be described. FIG. 8 illustrates a state in which a voice packet from a certain voice communication terminal 100 is transmitted to a plurality of the voice communication terminals 100 via the distribution server 200. In this case, the top voice communication terminal 100 on the left side constitutes a transmission terminal, and the other voice communication terminals 100 on the left side constitute reception terminals.

Figure 9:
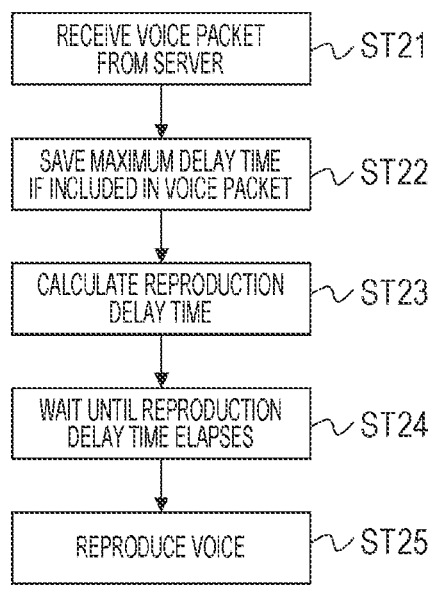
FIG. 9 is a flowchart schematically illustrating an exemplary voice reproduction process in the voice communication terminal that has received a voice packet from the distribution server.

The flowchart of FIG. 9 schematically illustrates an exemplary voice reproduction process in the voice communication terminal 100 that has received a voice packet from the distribution server 200. The voice communication terminal 100 as a reception terminal receives, using the voice packet reception unit 111, a voice packet transmitted from the distribution server 200 (step ST21).

Next, in a case where the voice packet transmitted from the distribution server 200 includes maximum delay time information, the voice communication terminal 100 as a reception terminal extracts, using the voice packet reception unit 111, the information and saves it in the maximum delay time storage 104 by overwriting (step ST22). Next, with the reproduction delay time calculation unit 113, the voice communication terminal 100 calculates, using the delay time of its own terminal and the maximum delay time, a reproduction delay time on the basis of the formula (1) mentioned above (step ST23).

Next, under the control of the reproduction control unit 114, the voice communication terminal 100 as a reception terminal performs control to wait for reproduction until the calculated reproduction delay time elapses (step ST24). Then, after the reproduction delay time has elapsed, the voice communication terminal 100 as a reception terminal reproduces the audio data included in the voice packet using the voice reproduction unit 112 (step ST25).

In this manner, each of the voice communication terminals 100 as a reception terminal delays the reproduction of the audio data included in the received voice packet by the reproduction delay time obtained as described above. Therefore, reproduction timing of each of the voice communication terminals 100 can be synchronized, which makes it possible to achieve a smooth conversation.

Figure 10:
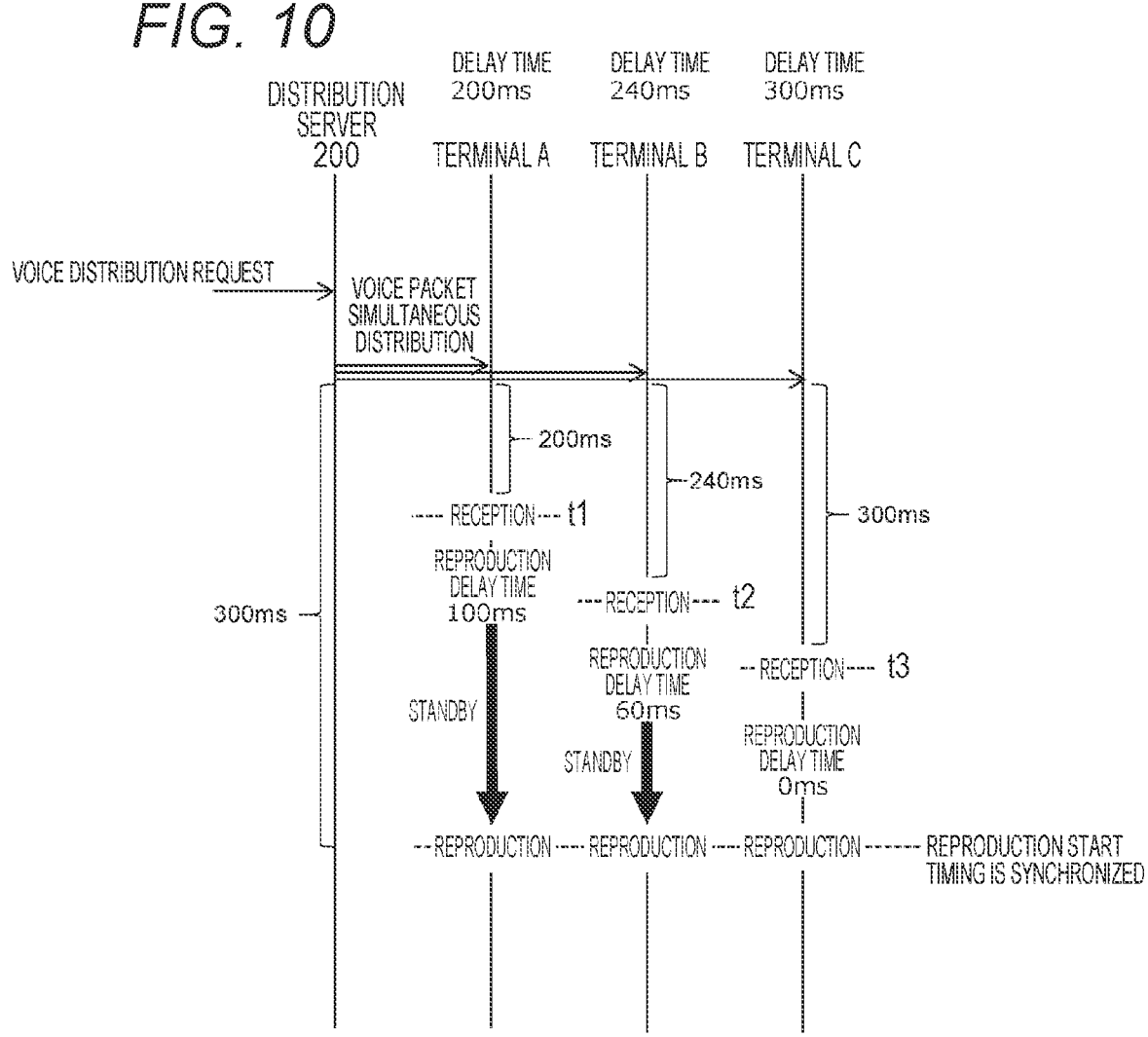
FIG. 10 is a diagram illustrating an exemplary processing sequence of each terminal in a case where the distribution server has simultaneously transmitted voice packets to terminals A, B, and C.

FIG. 10 illustrates an exemplary processing sequence of each terminal in a case where the distribution server 200 has simultaneously transmitted voice packets to the terminals A, B, and C. In the illustrated example, a case where the delay times of the terminals A, B, and C are 200 ms, 240 ms, and 300 ms, respectively, and the maximum delay time is 300 ms is illustrated.

In the case of the terminal A, a reproduction delay time is calculated to be 100 ms(=300 ms−200 ms), and reproduction starts after 100 ms has passed from the timing t1 at which the voice packet is received (when 200 ms has passed from when the distribution server 200 transmits the voice packet). Furthermore, in the case of the terminal B, a reproduction delay time is calculated to be 60 ms(=300 ms−240 ms), and reproduction starts after 60 ms has passed from the timing t2 at which the voice packet is received (when 240 ms has passed from when the distribution server 200 transmits the voice packet).

Furthermore, in the case of the terminal C, a reproduction delay time is calculated to be 0 ms(=300 ms−300 ms), and reproduction starts immediately after the timing t3 at which the voice packet is received (when 300 ms has passed from when the distribution server 200 transmits the voice packet). In this manner, in any of the terminals A, B, and C, the voice reproduction starts when 300 ms has passed from when the distribution server 200 transmits the voice packet, whereby the reproduction timing can be synchronized.

"Wait Notification Process of Transmission Terminal"

Figure 11:
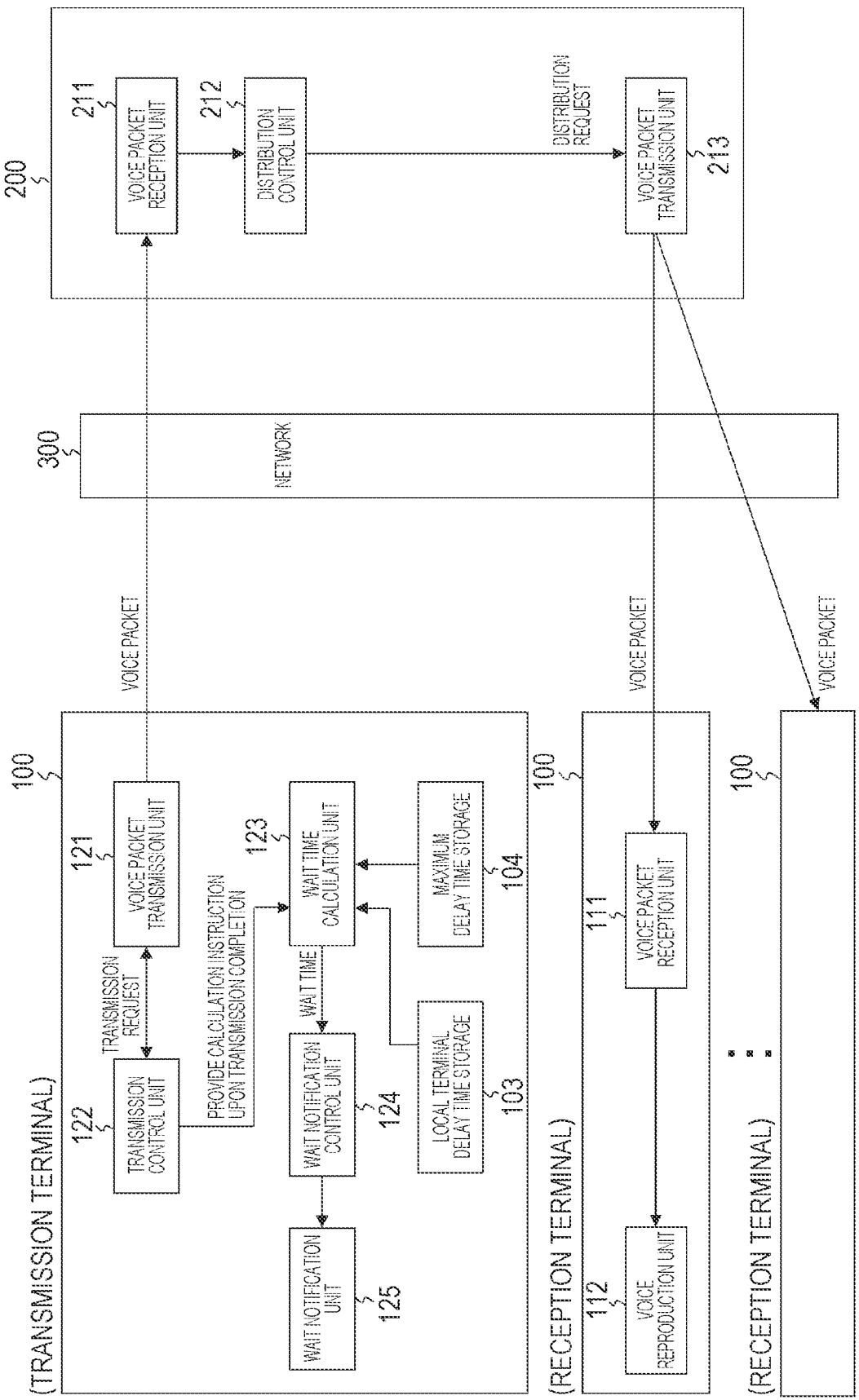
FIG. 11 is a diagram illustrating a state in which a voice packet from a certain voice communication terminal is transmitted to a plurality of voice communication terminals via the distribution server.

Details of a wait notification process performed in the voice communication terminal 100 that transmits a voice packet will be described. FIG. 11 illustrates a state in which a voice packet from a certain voice communication terminal 100 is transmitted to a plurality of the voice communication terminals 100 via the distribution server 200. In this case, the top voice communication terminal 100 on the left side constitutes a transmission terminal, and the other voice communication terminals 100 on the left side constitute reception terminals.

Figure 12:
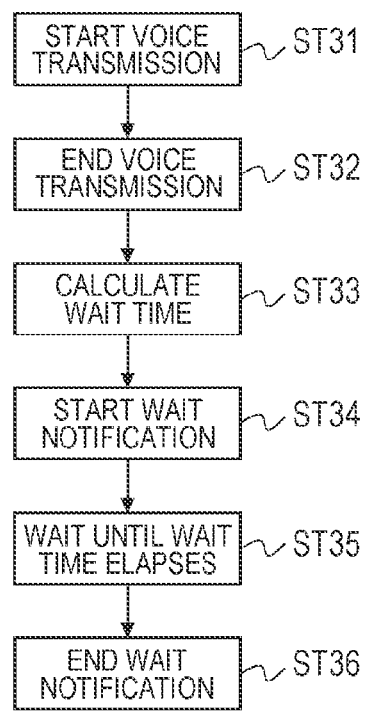
FIG. 12 is a flowchart schematically illustrating an exemplary wait notification process in the voice communication terminal that transmits a voice packet to the distribution server.

FIG. 12 is a flowchart schematically illustrating an exemplary wait notification process in the voice communication terminal 100 that transmits a voice packet to the distribution server 200. The voice communication terminal 100 as a transmission terminal transmits a transmission request to the voice packet transmission unit 121 using the transmission control unit 122, and starts voice transmission (step ST31). In this case, the voice packet transmission unit 121 transmits a voice packet to the distribution server 200.

Note that the distribution server 200 supplies the voice packet received by the voice packet reception unit 211 to the voice packet transmission unit 213 through the distribution control unit 212, and transmits it from the voice packet transmission unit 213 to the plurality of voice communication terminals 100 as reception terminals.

The voice communication terminal 100 as a transmission terminal ends the voice transmission in a case where a series of speaking of the user is complete (step ST32). Then, with the wait time calculation unit 123, the voice communication terminal 100 calculates, using the delay time of its own terminal and the maximum delay time, a wait time on the basis of the formula (2) mentioned above (step ST33).

Next, under the control of the wait notification control unit 124, the voice communication terminal 100 as a transmission terminal starts wait notification using the wait notification unit 125 (step ST34). Then, the voice communication terminal 100 as a transmission terminal continues the wait notification using the wait notification unit 125 until the wait time elapses (step ST35). Then, after the wait time has elapsed, the voice communication terminal 100 as a transmission terminal ends the wait notification using the wait notification unit 125 under the control of the wait notification control unit 124 (step ST36).

By notifying the user of being in the wait time in this manner, the user is enabled to easily know the speaking timing from the local terminal, and speech from the local terminal and speech from another terminal can be made not to mix, whereby a smooth conversation can be achieved.

Figure 13:
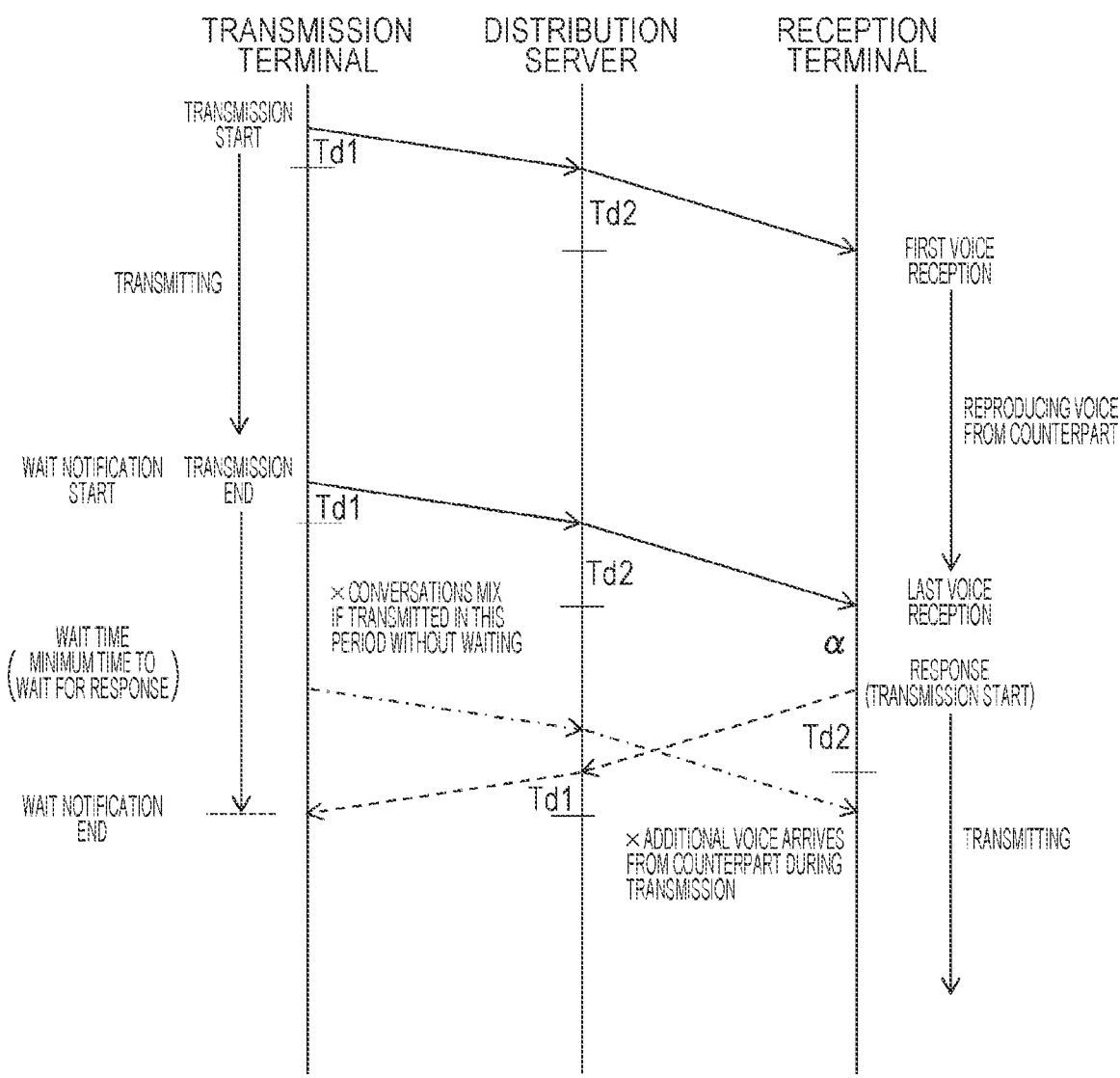
FIG. 13 is a diagram for explaining a transmission wait time in a transmission terminal.

FIG. 13 indicates that transmission by the transmission terminal is delayed and transmitted to the reception terminal (see solid lines). Furthermore, it indicates that response transmission by the reception terminal, which is made after the last voice reception of the transmission from the transmission terminal, is delayed and transmitted to the transmission terminal (see broken lines). In this case, if the transmission terminal newly carries out transmission before the response transmission from the reception terminal arrives, the conversations are mixed (see dot-dash lines). Note that, in the illustrated example, Td1 indicates the delay time of the transmission terminal, and Td2 indicates the delay time of the reception terminal.

As described above, with the transmission terminal notifying the user of being in the wait time that is the minimum time to wait for a response, the user can refrain from making new transmission using the transmission terminal before the response transmission arrives from the reception terminal, whereby speech from the local terminal and speech from another terminal can be made not to mix.

"Distribution Process of Distribution Server"

Figure 14:
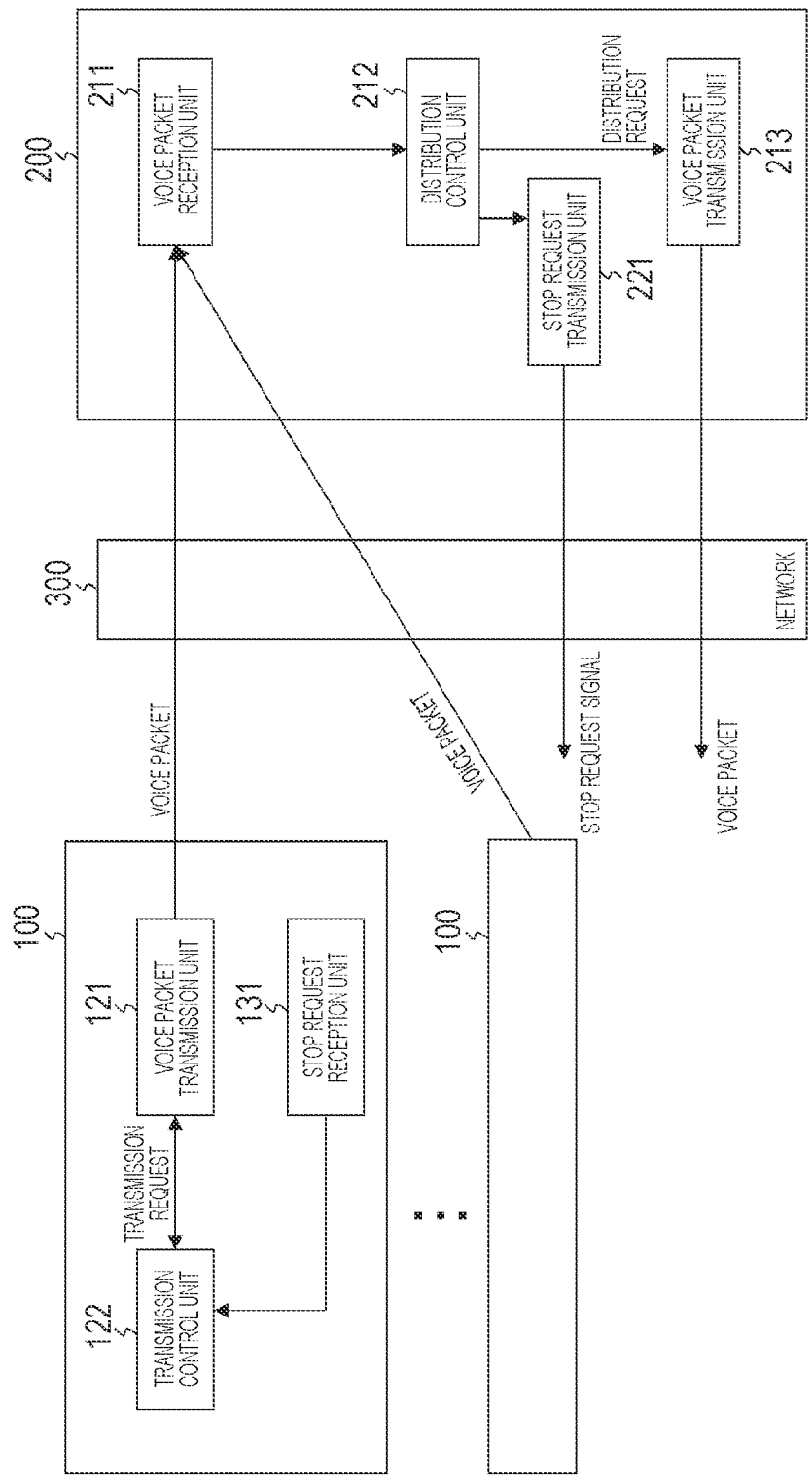
FIG. 14 is a diagram illustrating a state in which a voice packet from one voice communication terminal is selected and transmitted to another voice communication terminal in a case where voice packets from a plurality of voice communication terminals are received in a temporally overlapped manner.

Details of a distribution process performed by the distribution server 200 will be described. FIG. 14 illustrates a state in which a voice packet from one voice communication terminal 100 is selected and transmitted to another voice communication terminal 100 in a case where voice packets from a plurality of voice communication terminals 100 are received in a temporally overlapped manner. In this case, the stop request transmission unit 221 of the distribution server 200 transmits stop request signals for stopping the transmission to each of the voice communication terminals 100 that has not been selected.

Conceivable examples of a method for the distribution server 200 to select a voice packet from one voice communication terminal 100 include the following method 1 and a method 2. According to the method 1, at the time of selecting a voice packet from one voice communication terminal 100, a voice packet from the voice communication terminal 100 whose voice packet has been received at the earliest among the plurality of voice communication terminals 100 is selected.

Figure 15:
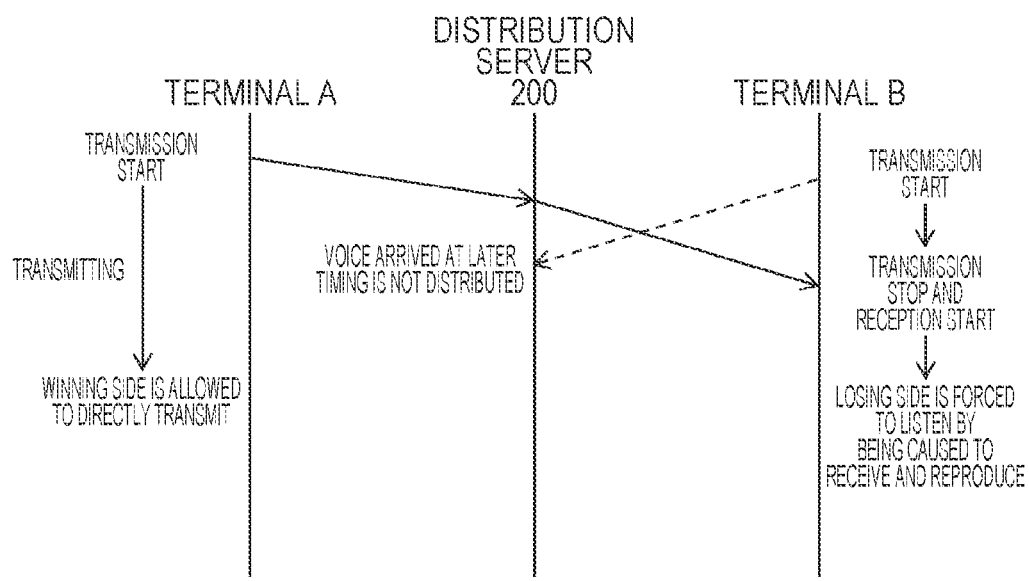
FIG. 15 is a diagram illustrating, as a method of selecting a voice packet from one voice communication terminal and transmitting it to another voice communication terminal, a method 1 in which the voice packet that has first arrived at the server is prioritized.

FIG. 15 schematically illustrates the method 1. In the illustrated example, the distribution server 200 receives the voice packet from the terminal B after receiving the voice packet from the terminal A. In this case, the distribution control unit 212 selects the voice packet from the terminal A as a voice packet to be transmitted (distributed), and transmits it to the terminal B. Furthermore, in this case, the distribution control unit 212 transmits stop request signals from the stop request transmission unit 221 to the terminal B.

Figure 16:
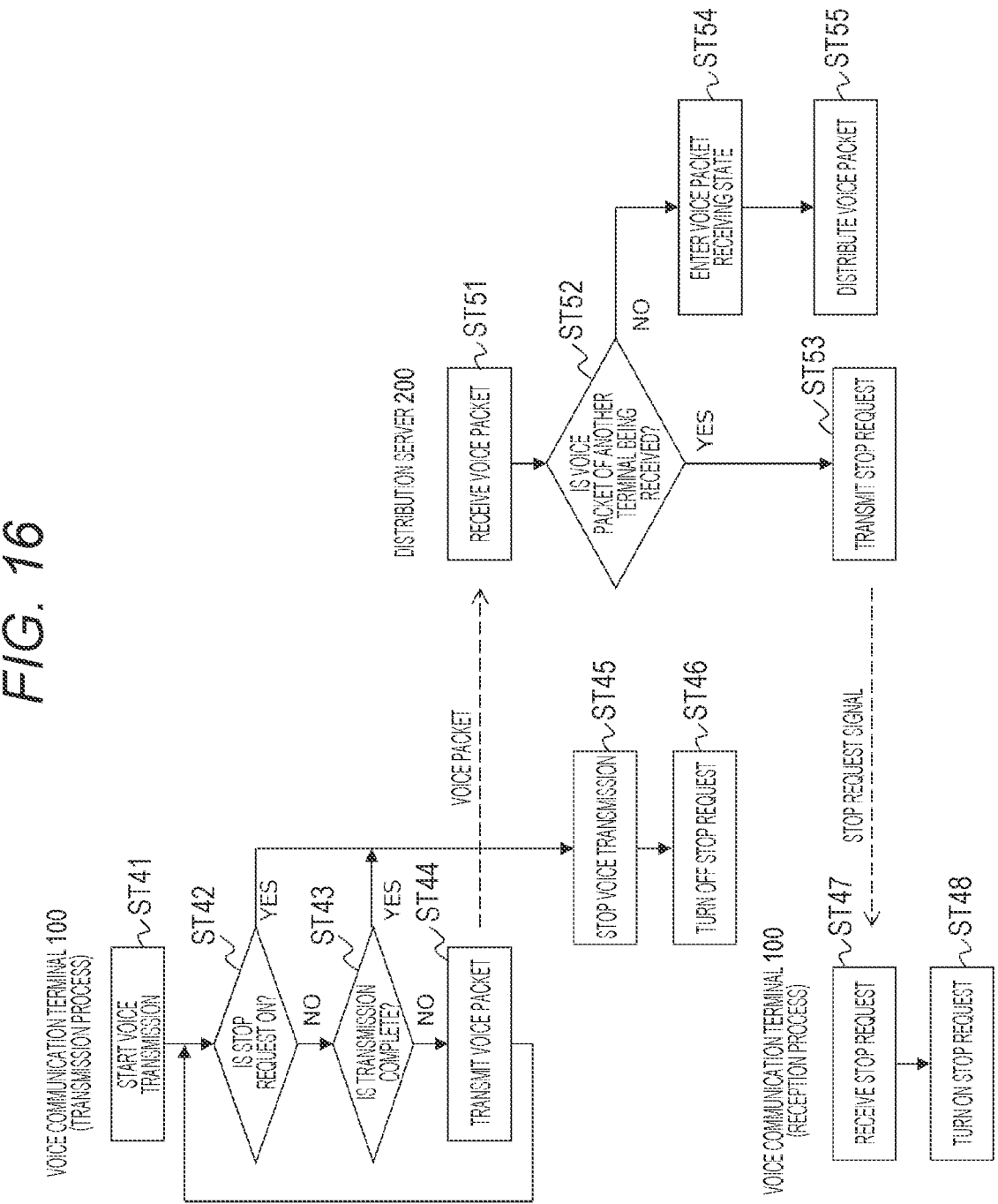
FIG. 16 is a flowchart schematically illustrating an exemplary transmission process of the voice communication terminal and an exemplary distribution process of the distribution server in a case where the method 1 is adopted.

The flowchart of FIG. 16 schematically illustrates an exemplary transmission process of the voice communication terminal 100 and an exemplary distribution process of the distribution server 200 in a case where the method 1 is adopted. The voice communication terminal 100 starts, using the voice packet transmission unit 121, transmitting a voice packet to the distribution server 200 on the basis of the transmission request from the transmission control unit 122 (step ST41).

Next, the voice communication terminal 100 determines whether or not the stop request is on using the transmission control unit 122 (step ST42). When the stop request is not turned on, the voice communication terminal 100 determines whether or not the transmission is complete using the transmission control unit 122 (step ST43). Here, the transmission control unit 122 determines that the transmission is complete when the end of speech is detected or at the time of a timeout at which a certain period of time has elapsed without voice input. When the transmission is not complete, the voice communication terminal 100 continues the voice packet transmission (step ST44).

When the stop request is on or when the transmission is complete, the voice communication terminal 100 stops transmitting the voice packet from the voice packet transmission unit 121 (step ST45). Then, the voice communication terminal 100 turns off the stop request (step ST46).

The distribution server 200 receives the voice packet transmitted from the voice communication terminal 100 using the voice packet reception unit 211 (step ST51). Then, the distribution server 200 determines whether or not a voice packet of another terminal is being received using the distribution control unit 212 (step ST52). When a voice packet of another terminal is being received, the distribution server 200 transmits, using the stop request transmission unit 221, stop request signals to the voice communication terminal 100 that has transmitted the voice packet (step ST53).

Furthermore, when a voice packet of another terminal is not being received, the distribution server 200 enters a voice packet receiving state using the distribution control unit 212 (step ST54). Then, under the control of the distribution control unit 212, the distribution server 200 transmits a voice packet to another terminal using the voice packet transmission unit 213 (step ST55).

The voice communication terminal 100 receives the stop request signals using the stop request reception unit 131 (step ST47). Then, the voice communication terminal 100 turns on the stop request using the transmission control unit 122 (step ST48). With the stop request turned on in this manner, the voice packet transmission stops as described above (step ST45).

Furthermore, according to the method 2, at the time of selecting a voice packet from one voice communication terminal 100, the voice packet from the voice communication terminal 100 having the maximum delay time with its own server among the plurality of voice communication terminals 100 is selected.

Figure 17:
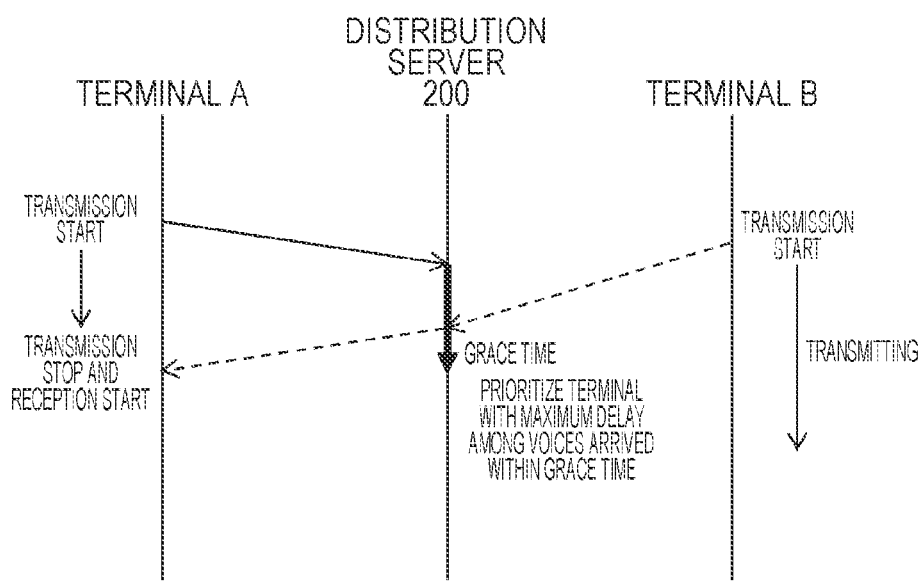
FIG. 17 is a diagram illustrating, as a method of selecting a voice packet from one voice communication terminal and transmitting it to another voice communication terminal, a method 2 in which the voice packet with a larger delay is prioritized.

FIG. 17 schematically illustrates the method 2. In the illustrated example, after receiving the voice packet from the terminal A, the distribution server 200 receives the voice packet from the terminal B within a grace time (certain period of time). In this case, the distribution control unit 212 selects the voice packet from the terminal B having the largest delay time within the grace time as a voice packet to be transmitted (distributed), and transmits it to the terminal A. Furthermore, in this case, the distribution control unit 212 transmits stop request signals from the stop request transmission unit 221 to the terminal A.

The flowchart of FIG. 18 schematically illustrates an exemplary transmission process of the voice communication terminal 100 and an exemplary distribution process of the distribution server 200 in a case where the method 2 is adopted. In FIG. 18, the parts corresponding to those in FIG. 16 are denoted by the same reference signs.

The voice communication terminal 100 starts, using the voice packet transmission unit 121, transmitting a voice packet to the distribution server 200 on the basis of the transmission request from the transmission control unit 122 (step ST41).

Next, the voice communication terminal 100 determines whether or not the stop request is on using the transmission control unit 122 (step ST42). When the stop request is not turned on, the voice communication terminal 100 determines whether or not the transmission is complete using the transmission control unit 122 (step ST43). Here, the transmission control unit 122 determines that the transmission is complete when the end of speech is detected or at the time of a timeout at which a certain period of time has elapsed without voice input. When the transmission is not complete, the voice communication terminal 100 continues the voice packet transmission (step ST44).

When the stop request is on or when the transmission is complete, the voice communication terminal 100 stops transmitting the voice packet from the voice packet transmission unit 121 (step ST45). Then, the voice communication terminal 100 turns off the stop request (step ST46).

The distribution server 200 receives the voice packet transmitted from the voice communication terminal 100 using the voice packet reception unit 211 (step ST51). Then, the distribution server 200 determines whether or not a voice packet of another terminal is being received using the distribution control unit 212 (step ST52). When a voice packet of another terminal is being received, the distribution server 200 transmits, using the stop request transmission unit 221, stop request signals to the voice communication terminal 100 that has transmitted the voice packet (step ST53).

Furthermore, when a voice packet of another terminal is not being received, the distribution server 200 sets, using the distribution control unit 212, the voice communication terminal 100 associated with the voice packet transmission as a selected terminal (step ST61). The distribution server 200 determines whether or not the grace time (certain period of time) has elapsed using the distribution control unit 212 (step ST62).

When the grace time has not elapsed, the distribution server 200 determines, using the distribution control unit 212, whether or not a voice packet has been received from another voice communication terminal 100 (step ST63). When a voice packet has been received from another voice communication terminal 100, the distribution server 200 determines, using the distribution control unit 212, whether or not the delay time of the other voice communication terminal 100 is larger than that of the selected terminal (step ST64).

When the delay time of the other voice communication terminal 100 is larger than the delay time of the selected terminal, the distribution server 200 transmits, using the stop request transmission unit 221, stop request signals to the selected terminal (step ST65). Then, the other voice communication terminal 100 is newly set as a selected terminal (step ST66). On the other hand, when the delay time of the other voice communication terminal 100 is not larger than the delay time of the selected terminal, the distribution server 200 transmits, using the stop request transmission unit 221, stop request signals to the other terminal (step ST67).

Furthermore, when the grace time has elapsed, the distribution server 200 enters a voice packet receiving state using the distribution control unit 212 (step ST54). Then, under the control of the distribution control unit 212, the distribution server 200 transmits a voice packet of the selected terminal using the voice packet transmission unit 213 (step ST55).

The voice communication terminal 100 receives the stop request signals using the stop request reception unit 131 (step ST47). Then, the voice communication terminal 100 turns on the stop request using the transmission control unit 122 (step ST48). With the stop request turned on in this manner, the voice packet transmission stops as described above (step ST45).

As described above, in the state where the distribution server 200 receives voice packets from a plurality of voice communication terminals 100 in a temporally overlapped manner, a voice packet from one voice communication terminal 100 is selected and transmitted (distributed) to the other voice communication terminals 100, whereby collision of speech from the plurality of voice communication terminals 100 can be suppressed, and a smooth conversation can be achieved.

As described above, in the voice communication system 10 illustrated in FIG. 1, each of the voice communication terminals 100 as a reception terminal calculates a reproduction delay time on the basis of the first delay time (delay time of the local terminal) and the second delay time (maximum delay time among delay times of a plurality of terminals including the local terminal), and delays reproduction of the audio data included in the received voice packet by the reproduction delay time. Therefore, it becomes possible to synchronize reproduction timing of all the terminals to which a voice packet is distributed from the distribution server 200, whereby a smooth conversation can be achieved.

Furthermore, in the voice communication system 10 illustrated in FIG. 1, the voice communication terminal 100 as a transmission terminal notifies the user of being in the wait time from when the voice packet transmission stops until when voice packet transmission becomes available next. Therefore, the user is enabled to easily know the speaking timing from the local terminal, and speech from the local terminal and speech from another terminal can be made not to mix, whereby a smooth conversation can be achieved.

Furthermore, in the voice communication system 10 illustrated in FIG. 1, in the state where voice packets from a plurality of voice communication terminals 100 are received in a temporally overlapped manner, the distribution server 200 selects a voice packet from one voice communication terminal 100 and distributes it to other voice communication terminals 100. Therefore, it becomes possible to suppress collision of speech from the plurality of voice communication terminals 100, whereby a smooth conversation can be achieved.

2. Variations

Note that, although not described above, the present technology can be similarly applied to voice communication in the field such as broadcasting and medical treatment, and makes it possible to achieve a smooth conversation.

Furthermore, although the preferred embodiment of the present disclosure has been described in detail with reference to the accompanying drawings, the technical scope of the present disclosure is not limited to such an example. It is obvious that those skilled in the art in the technical field of the present disclosure may find various alterations and modifications within the technical ideas of the appended claims, and it should be understood that such alterations and modifications are also naturally within the technical scope of the present disclosure.

Furthermore, the present technology can also take the following configurations.

(1) A voice communication terminal including:
a voice packet transmission unit that transmits a voice packet to a distribution server; and
a notification control unit that notifies a user of being in a wait time from when transmission of the voice packet stops until when voice packet transmission becomes available next, in which
the wait time is calculated on the basis of delay time information between the distribution server and a plurality of voice communication terminals.

(2) The voice communication terminal according to (1) described above, in which
the wait time is calculated on the basis of a first delay time that is a delay time between the voice communication terminal and the distribution server and a second delay time that is the maximum delay time among delay times between a plurality of terminals including the voice communication terminal and the distribution server.

(3) The voice communication terminal according to (2) described above, further including:
a wait time calculation unit that calculates the wait time on the basis of the first delay time and the second delay time.

(4) The voice communication terminal according to (3) described above, in which
the wait time calculation unit includes at least a time twice as long as the first delay time and a time twice as long as the second delay time in the wait time.

(5) The voice communication terminal according to any one of (2) to (4) described above, further including:
a delay time update unit that periodically updates the first delay time and the second delay time.

(6) The voice communication terminal according to (5) described above, in which
the delay time update unit periodically updates the first delay time and the second delay time on the basis of time information from the distribution server.

(7) The voice communication terminal according to any one of (2) to (6) described above, further including:
a packet reception unit that receives a voice packet from the distribution server; and
a reproduction control unit that delays reproduction of audio data included in the received voice packet by a reproduction delay time obtained on the basis of the first delay time and the second delay time.

(8) The voice communication terminal according to (7) described above, further including:
a reproduction delay time calculation unit that calculates the reproduction delay time on the basis of the first delay time and the second delay time.

(9) The voice communication terminal according to any one of (1) to (8) described above, in which
the notification control unit makes notification indicating that it is within the wait time in a visual, auditory, or tactile output mode.

(10) An information processing method for a voice communication terminal, the method including:
transmitting a voice packet to a distribution server; and
notifying a user of being in a wait time from when transmission of the voice packet stops until when voice packet transmission becomes available next, in which
the wait time is calculated on the basis of a first delay time that is a delay time between the voice communication terminal and the distribution server and a second delay time that is the maximum delay time among delay times between a plurality of terminals including the voice communication terminal and the distribution server.

(11) A program causing a computer to function as:
a voice packet transmission means that transmits a voice packet to a distribution server; and
a notification control means that notifies a user of being in a wait time from when transmission of the voice packet stops until when voice packet transmission becomes available next, in which
the wait time is calculated on the basis of a first delay time that is a delay time between a local terminal and the distribution server and a second delay time that is the maximum delay time among delay times between a plurality of terminals including the local terminal and the distribution server.

(12) A distribution server including:
a voice packet processing unit that receives a voice packet from a voice communication terminal among a plurality of voice communication terminals and distributes the voice packet to the other voice communication terminals among the plurality of voice communication terminals; and
a delay information processing unit that receives delay time information between the plurality of voice communication terminals and the distribution server and transmits maximum delay time information to the plurality of voice communication terminals.

(13) The distribution server according to (12) described above, in which
the delay information processing unit transmits the maximum delay time information to the plurality of voice communication terminals using a synchronous packet or a voice packet.

(14) An information processing method for a voice communication terminal, the method including:
receiving a voice packet from a distribution server; and
delaying reproduction of audio data included in the received voice packet by a reproduction delay time calculated on the basis of a first delay time that is a delay time between the voice communication terminal and the distribution server and a second delay time that is the maximum delay time among delay times between a plurality of terminals including the voice communication terminal and the distribution server.

(15) The information processing method for a voice communication terminal according to (14) described above, the method further including:
calculating the reproduction delay time on the basis of the first delay time and the second delay time.

(16) The information processing method for a voice communication terminal according to (15) described above, in which
the reproduction delay time is calculated by subtracting the first delay time from the second delay time.

(17) The information processing method for a voice communication terminal according to any one of (14) to (16) described above, the method further including:
periodically updating the first delay time and the second delay time.

(18) The information processing method for a voice communication terminal according to (17) described above, in which
the first delay time and the second delay time are periodically updated on the basis of time information from the distribution server.

(19) An information processing method for a distribution server, the method including:
receiving a voice packet from a voice communication terminal and transmitting the voice packet to another voice communication packet; and
in a state of receiving voice packets from a plurality of voice communication terminals in a temporally overlapped manner, performing control to select a voice packet from one voice communication terminal and distributing the voice packet to another voice communication terminal.

(20) The information processing method for a distribution server according to (19) described above, in which
at the time of selecting the voice packet from the one voice communication terminal, a voice packet from a voice communication terminal whose voice packet has been received at the earliest among the plurality of voice communication terminals is selected.

(21) The information processing method for a distribution server according to (19) described above, in which
at the time of selecting the voice packet from the one voice communication terminal, a voice packet from a voice communication terminal having the maximum delay time with the distribution server among the plurality of voice communication terminals is selected.

REFERENCE SIGNS LIST

10 Voice communication system
100 Voice communication terminal
101 Time synchronization client
102 Local terminal delay time calculation unit
103 Local terminal delay time storage
104 Maximum delay time storage
111 Voice packet reception unit
112 Voice reproduction unit
113 Reproduction delay time calculation unit
114 Reproduction control unit
121 Voice packet transmission unit
122 Transmission control unit
123 Wait time calculation unit
124 Wait notification control unit
125 Wait notification unit
131 Stop request reception unit
200 Distribution server
201 Time synchronization server
202 Each-terminal delay time storage
203 Maximum delay time acquisition unit
211 Voice packet reception unit
212 Distribution control unit
213 Voice packet transmission unit
221 Stop request transmission unit
300 Network

The invention claimed is:

1. A voice communication terminal, comprising:
a voice packet transmission unit configured to transmit a first voice packet to a distribution server; and
a notification control unit configured to notify a user of being in a wait time from when transmission of the first voice packet stops until when a second voice packet transmission becomes available next, wherein
the wait time is calculated based on a first delay time and a second delay time,
the first delay time corresponds to a delay time from the voice communication terminal to the distribution server,
the second delay time corresponds to a delay time among delay times from a plurality of voice communication terminals to the distribution server, and
the plurality of voice communication terminals includes the voice communication terminal.

2. The voice communication terminal according to claim 1, wherein the second delay time corresponds to a maximum delay time among delay times from the plurality of voice communication terminals including the voice communication terminal to the distribution server.

3. The voice communication terminal according to claim 2, further comprising:
a wait time calculation unit configured to calculate the wait time based on the first delay time and the second delay time.

4. The voice communication terminal according to claim 3, wherein the wait time calculation unit includes at least a time twice as long as the first delay time and a time twice as long as the second delay time in the wait time.

5. The voice communication terminal according to claim 2, further comprising:
a delay time update unit configured to periodically update first delay time and the second delay time.

6. The voice communication terminal according to claim 5, wherein the delay time update unit is further configured to periodically update the first delay time and the second delay time based on time information from the distribution server.

7. The voice communication terminal according to claim 2, further comprising:
a packet reception unit configured to receive a third voice packet from the distribution server; and
a reproduction control unit configured to delay reproduction of audio data included in the received third voice packet by a reproduction delay time obtained based on the first delay time and the second delay time.

8. The voice communication terminal according to claim 7, further comprising:
a reproduction delay time calculation unit configured to calculate the reproduction delay time based on the first delay time and the second delay time.

9. The voice communication terminal according to claim 1, wherein
the notification control unit is further configured to control notification indicating that the user is within the wait time, and
the notification is in a visual, auditory, or tactile output mode.

10. An information processing method for a voice communication terminal, the method comprising:
transmitting a voice packet to a distribution server; and
notifying a user of being in a wait time from when transmission of the voice packet stops until when voice packet transmission becomes available next, wherein
the wait time is calculated based on a first delay time and a second delay time,
the first delay time corresponds to a delay time from the voice communication terminal to the distribution server, and
the second delay time corresponds to a maximum delay time among delay times from a plurality of voice communication terminals including the voice communication terminal to the distribution server.

11. A non-transitory computer-readable medium having stored thereon, computer-executable instructions which, when executed by a computer, cause the computer to execute operations, the operations comprising:
transmitting a voice packet to a distribution server; and
notifying a user of being in a wait time from when transmission of the voice packet stops until when voice packet transmission becomes available next, wherein
the wait time is calculated based on a first delay time and a second delay time,
the first delay time corresponds to a delay time from a local terminal to the distribution server, and
the second delay time corresponds to a maximum delay time among delay times from a plurality of terminals including the local terminal to the distribution server.

12. A distribution server, comprising:
a voice packet processing unit configured to:
receive a voice packet from a first voice communication terminal among a plurality of voice communication terminals; and
control distribution of the voice packet to at least a second voice communication terminal among the plurality of voice communication terminals, wherein the second voice communication terminal is different from the first voice communication terminal;
a delay information processing unit configured to:
receive a plurality of delay time information between the plurality of voice communication terminals and the distribution server; and
transmit maximum delay time information among delay time information between the plurality of delay time information and the plurality of voice communication terminals, using a synchronous packet; and
a time synchronization server configured to periodically exchange the synchronous packet with a time synchronization client of each of the plurality of voice communication terminals.

13. The distribution server according to claim 12, wherein the delay information processing unit is further configured to transmit the maximum delay time information to the plurality of voice communication terminals using a voice packet.

14. An information processing method for a voice communication terminal, the method comprising:
receiving a voice packet from a distribution server;
delaying reproduction of audio data included in the received voice packet by a reproduction delay time; and
calculating the reproduction delay time, based on a first delay time and a second delay time, wherein
the first delay time corresponds to a delay time from the voice communication terminal to the distribution server, and
the second delay time corresponds to a maximum delay time among delay times from a plurality of voice communication terminals including the voice communication terminal to the distribution server.

15. The information processing method for a voice communication terminal according to claim 14, wherein the reproduction delay time is calculated by subtracting the first delay time from the second delay time.

16. The information processing method for a voice communication terminal according to claim 14, the method further comprising:
periodically updating the first delay time and the second delay time.

17. The information processing method for a voice communication terminal according to claim 16, wherein the first delay time and the second delay time are periodically updated based on time information from the distribution server.

18. An information processing method for a distribution server, the method comprising:
receiving a voice packet from a first voice communication terminal;
transmitting the voice packet to a second voice communication terminal of a plurality of voice communication terminals, wherein
the second voice communication terminal is different from the first voice communication terminal;
controlling, based on reception of a plurality of voice packets from the plurality of voice communication terminals in a temporally overlapped manner, selection of a specific voice packet from a specific voice communication terminal, of the plurality of voice communication terminals, whose voice packet has been received at earliest; and controlling distribution of distributing the specific voice packet to at least a third another voice communication terminal of the plurality of voice communication terminals.

\* \* \* \* \*